United States Patent [19]

Miyoshi et al.

[11] 4,360,263

[45] Nov. 23, 1982

[54] COPYING APPARATUS

[75] Inventors: Yoshitake Miyoshi, Nara; Jiro Fujii, Kadoma; Tsugio Nakanishi, Neyagawa; Ichiro Takahashi, Kadoma; Hideaki Tsudaka; Masami Kai, both of Neyagawa, all of Japan

[73] Assignee: Mita Industrial Company Limited, Osaka, Japan

[21] Appl. No.: 137,981

[22] Filed: Apr. 7, 1980

[30] Foreign Application Priority Data

| | | | |
|---|---|---|---|
| Apr. 10, 1979 | [JP] | Japan | 54-44775 |
| Apr. 10, 1979 | [JP] | Japan | 54-44776 |
| Apr. 10, 1979 | [JP] | Japan | 54-44777 |
| Sep. 26, 1979 | [JP] | Japan | 54-124402 |

[51] Int. Cl.[3] .......... G03B 29/00

[52] U.S. Cl. .......... 355/29; 355/13; 355/14 R

[58] Field of Search .......... 355/11, 13, 14 R, 28, 355/29

[56] References Cited

U.S. PATENT DOCUMENTS

| | | | |
|---|---|---|---|
| 3,762,813 | 10/1973 | Fowlie et al. | 355/11 X |
| 3,865,481 | 2/1975 | Washio et al. | 355/13 |

*Primary Examiner*—Richard A. Wintercorn
*Attorney, Agent, or Firm*—Wenderoth, Lind & Ponack

[57] ABSTRACT

A copying apparatus includes a copy paper cutting device which is operated when an original document or an optical device for exposure reaches a predetermined position. The original document or the optical device is stopped when a trailing edge of a copy paper is detected. After at least the leading edge of the copy paper passes through the copy paper cutting device, the copy paper is fed out entirely from an apparatus frame without operating the copy paper cutting device. This results in that the last copy paper sheet of the roll of copy paper is not shorter than the distance between transport rollers in the copy paper passageway to prevent a copy paper jam.

11 Claims, 23 Drawing Figures

COPYING APPARATUS

BACKGROUND OF THE INVENTION

1. Field of the Invention

The present invention relates to a copying apparatus employing a roll of copy paper.

2. Description of the Prior Art

In a prior art copying apparatus employing a roll of copy paper, the copy paper is cut so as to have a desired length by a copy paper cutting device when the original document or optical device reaches pre-determined position, and the last copy paper sheet having a length shorter than the distance between transport rollers situated in a copy paper transport pass is often left. This last copy paper sheet causes jamming in the copy paper passageway.

It is an object of this invention to solve the problem mentioned above and to provide a copying apparatus preventing the last copy paper sheet from a roll of copy paper from jamming.

A typical prior art comprises on the way of an original document passageway (a) detecting means for commencing feeding of the first sheet of the roll-like copy paper synchronous with detection of the lending edge of the original document and for severing the roll-like copy paper to stop feeding on the occurence of the detection of the trailing edge of the original document, (b) detecting means for detecting the trailing edge of the original document after the copying exposure operation to return the original document in a direction opposite to the copying exposure direction, (c) a cam for beginning to feed a second and further cppy paper during the time period when the original document is returned in the direction opposite to the copying exposure direction, and (d) detecting means for detecting the leading edge (i.e. the trailing edge in the reverse direction) of the original document returning in the reverse direction opposite to the copying exposure direction to transport the original document again in the copying exposure direction. In this prior art approach, three detecting means and a cam cooperate with each other to feed the second and further copy papers synchronously while the original document is returned in a direction opposite to the copying exposure direction so as to shorten the time for copying. The returning speed of the original document is chosen to be relatively greater to shorten the time for copying further. Therefore when the original document returns in a direction opposite to the copying exposure direction, the leading edge of the original document does not coincide with the leading edge of the copy paper because the transport distances in a direction opposite to the copying exposure direction are different, depending on the inertia force of each original document.

It is an object of this invention to provide an electrostatic copying apparatus for accomplishing a plurality of copies in a condition where the leading edge of the original document coincides precisely with the leading edge of the copy paper.

It is an object of the invention to provide a copying apparatus capable of mounting selectively an original document manual feeding assembly or an original document automatic feeding assembly, on the top of the frame of the apparatus.

Another object of the invention to simplify the construction of the original document manual feeding assembly and the original document automatic feeding assembly.

In another prior art arrangement of an electrostatic copying apparatus employing an original document automatic feeding assembly for feeding automatically a plurality of original documents into an original document passageway, there are provided an upper transport roller and a lower separate roller spaced from each other along axial lines thereof in a comb fashion upstream of a slanting original document plate along the transport direction, the lower separate roller being driven in a direction reverse to the transport direction to advance a top sheet of original documents sliding down on the original document plate by their own weight, thus to prevent a plurality of the original documents from being fed. In accordance with this prior art arrangement, the original document is modified or the leading edge of the original document is folded because the distance between the axes of the two rollers is less than the radii of the rollers.

Accordingly it is an object of the invention to provide an original document automatic feeding assembly capable of feeding original documents one by one positively to prevent original documents from being modified.

SUMMARY OF THE INVENTION

To accomplish the foregoing objectives, there is provided an improved copying apparatus employing a roll of copy paper.

A copy paper cutting device provided on the copy paper passageway cuts the roll of copy paper during a copying operation. Detecting means is provided downstream with respect to the copy paper cutting device along a transport direction of the copy paper passageway for detecting a trailing edge of the copy paper. Driving means drives an original document or an optical device. Detecting means detects a moving position of the original document or the optical device. The copy paper cutting device is operated when the moving position detecting means of the original document or the optical device detects a predetermined position of the original document or the copy paper. The driving means is operated when the trailing edge of the copy paper is detected by the copy paper trailing edge detecting means. Copy paper transport means transports the copy paper from a frame of the copying apparatus after at least the leading edge of the copy paper passes through the copy paper cutting device when the trailing edge of the copy paper is detected by the copy paper trailing edge detecting means, in order to prevent the last copy paper sheet of the roll of copy paper from being shorter than the distance between the transport rollers in the copy paper passageway, and to prevent a paper jam.

The distance from the copy paper trailing edge detecting means to the copy paper cutting device along the copy paper passageway is chosen to be longer than or equal to the distance between transport rollers spaced away from each other in the copy paper passageway.

There is provided a feeding roller between the copy paper trailing edge detecting means and the copy paper cutting device, and the distance between the feeding roller and the copy paper trailing edge detecting means is chosen to be longer than or equal to the distance from the copy paper cutting device to the transport roller nearest the copy paper cut device downstream along the copy paper transport direction.

The copying apparatus further comprises: a first detecting means provided upstream along the copying exposure direction with respect to the scanning window along an original document passageway for detecting the trailing edge of the original document; a second detecting means provided upstream of the copying exposure direction with respect to the scanning window of the original document passageway, and downstream with respect to the first detecting means, for detecting the leading edge of the original document; a third detecting means provided upstream of the transport direction with respect to an exposure station of the copy paper passageway spaced the same distance as that between the second detecting means and the scanning window, and downstream of the transport direction with respect to a cutting position of the copy paper cutting device spaced the same distance as that between the first detecting means and the second detecting means for detecting the leading edge of the copy paper; return control means for generating a signal when a predetermined time lapses after the leading edge of the copy paper passes through the third detecting means to transport the original document upstream with respect to the second detecting means in a direction reverse to the copying exposure direction; and a counter for stopping the return control means until a preset number of copying operation is achieved. The original document is stopped, the copy paper is commenced to be fed when the leading edge of the original document transported in the copying exposure direction along the original document passageway reaches the second detecting means. Then the original document is fed simultaneously when the leading edge of the copy paper after charging reaches the third detecting means, and an exposure operation, a developing operation and a fixing operation are accomplished in that order. The roll of copy paper is cut and the roll of copy paper is stopped from feeding when the trailing edge of the original document reaches the first detecting means, so that the leading edge of the original document precisely with the leading edge of the copy paper.

The return control means comprises a timer for generating a signal after the time period during which the trailing edge of the copy paper passes through the third detecting means, the copying exposure operation is accomplished, and the original document is returned in a direction reverse to the copying exposure direction.

The return control means comprises fourth detecting means provided downstream in the transport direction with respect to the exposure station of the copy paper passageway for detecting the trailing edge of the copy paper.

The roll of copy paper is cut and an exposure lamp is turned off when one of the first detecting means, the second detecting means and the third detecting means detects the original document or the copy paper during a time period corresponding to the length of the copy paper which is a maximum length permitting transportation of the copy paper.

In the case of a plurality of copies, the roll of copy paper is cut only when the first detecting means detects the trailing edge of the original document and the return control means is operated.

The copying apparatus comprises an original document automatic feeding assembly which comprises: an original document placing plate which is inclined to receive a plurality of original documents thereon; a transport roller rotating to transport a top sheet of the original documents moving downwardly by their own weight on the original document placing plate toward an original document passageway; a separating roller provided spaced below the transport roller and rotating so as to transport all sheets below the top sheet in a direction reverse it the transport direction; and a transport guide plate provided with portions on opposite sides of the transport roller and separating roller and in friction contact with the lower sheet of the original document; a surface of the transport guide plate which is closest to an axis of the transport roller is positioned forward in the transport direction with respect to a line connecting a center of the separating roller and a center of the transport roller on a side of the transport roller with respect to a trangential line of the separating roller at a right angle to the central line, so that the original documents are fed one by one positively to prevent the original documents from being modified.

The transport guide plate is adjustable vertically along the central line.

A plurality of driving transport rollers are mounted along the transport direction on the frame of the copying apparatus. Each of an original document manual feeding assembly for feeding the original documents individually and an original document automatic feeding assembly for feeding a plurality of the original documents automatically has follower transport rollers in contact with and driven by the driving transport rollers. The original document passageway is formed between the driving transport rollers and the follower transport rollers. The original document manual feeding assembly is provided on the leading portion thereof, in the transport direction, with an engaging member having a notch which engages a pin protuding from the top portion of a side wall of the copying apparatus frame. The original document automatic feeding assembly is provided on the leading portion thereto, in the transport direction, with an engaging member having a notch of the same dimension as the notch of the original document manual feeding assembly. The original document manual feeding assembly and the original document automatic feeding assembly are removable alternatively on the top portion of the frame, so that the original document manual feeding assembly and the original document automatic feeding assembly are selectively mounted on the top of the frame.

BRIEF DESCRIPTION OF THE DRAWINGS

A detailed description of the invention will be made with reference to the accompanying drawings wherein like numberals designate corresponding parts in the various figures, and wherein.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention since the scope of the invention is best defined by the appended claims.

Figure 1:
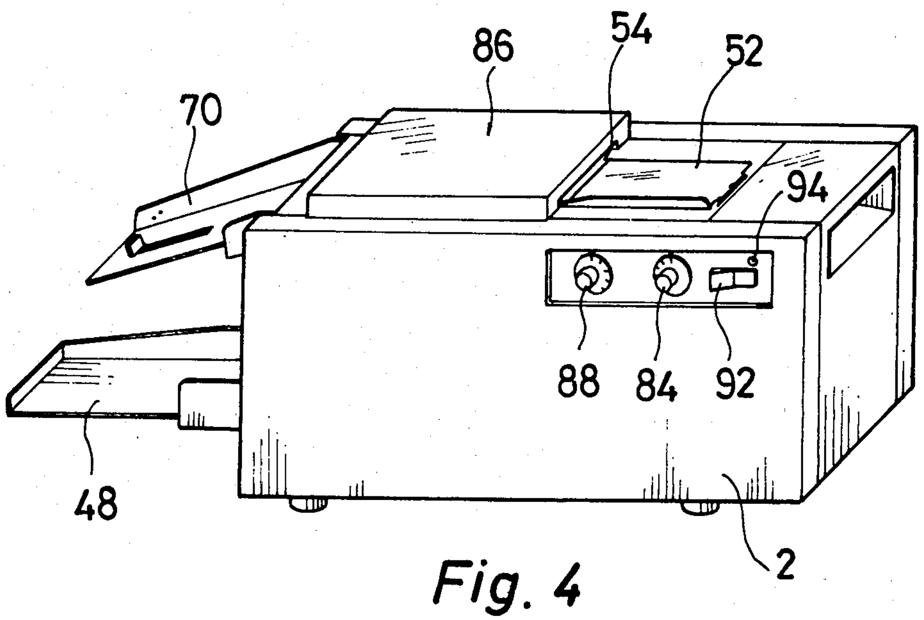
FIG. 1 is a perspective view of an electrostatic copying apparatus according to this invention.
Figure 2:
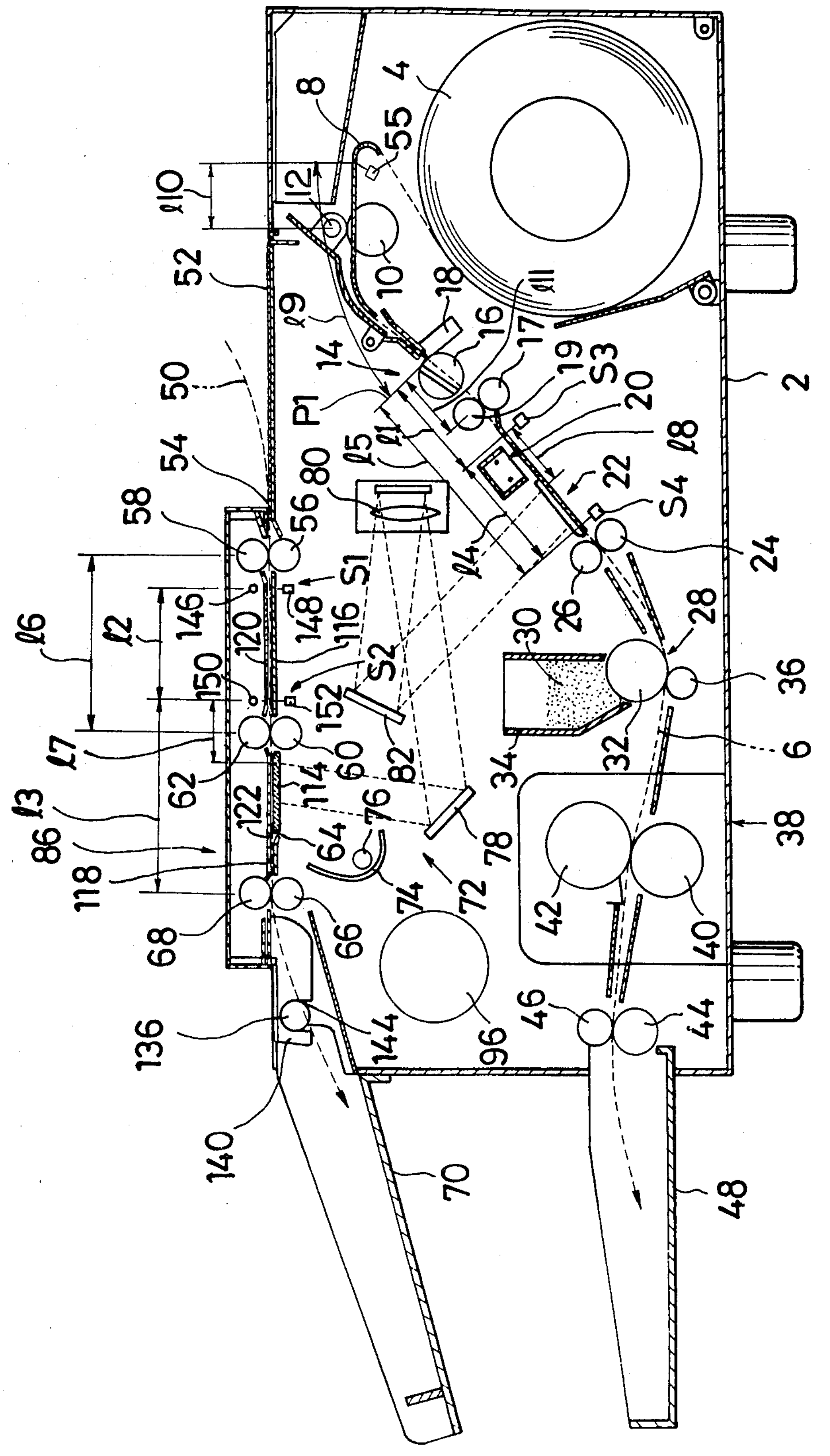
FIG. 2 is a schematic longitudinal sectional view of the front side of the copying apparatus shown in FIG. 1.

FIG. 1 is a perspective view of an electrostatic copying apparatus according to the invention and FIG. 2 is a cross sectional view showing from the front side of the electrostatic copying apparatus. A roll of copy paper 4 having a photo conductive layer thereon is mounted in a frame 2 of the electrostatic copying apparatus. The roll of copy paper 4 is fed over a guide plate 8 by means of a pair of feeding rollers 10 and 12 along a copy paper passageway 6 shown by a dotted line and is guided into a copy paper cutting device 14. This copy paper cutting device 14 includes a rotary knife 16 and a stationary knife 18 to cut the copy paper by the rotating operation of the rotary knife 16. A pair of transport rollers 17 and 19 situated downstream of the copy paper cutting device 14 in the copy paper passageway 6 advances the copy paper from a charging device 20 and an exposure station 22 in this order. Corona charging of the charging device 20 provides the photo conducting layer of the copy paper with a charge, and the exposure station 22 forms an electrostatic image corresponding to an original document image on the photo conductive layer. The copy paper on which the electrostatic image is formed is guided into a developing device 28 by means of a pair of transport rollers 24 and 26 situated downstream of the exposure station 22. In this developing device 28, the copy paper and the peripheral surface of a cylindrical retaining member 32 for retaining toner 30 mangetically thereon are moved at an equal speed to develope the electrostatic image on the copy paper by the toner 30. A toner supplying device 34 for storing the toner 30 and supplying it to the retaining member 32 is provided above the retaining member. Guide roller 36 is provided for guiding the copy paper below the retaining member 32. Further there is provided a pressure fixing device 38 downstream of the developing device 28 along the copy paper passageway 6. The copy paper which is developed by the developing device 28 passes between a pair of pressure rollers 40 and 42 of the pressure fixing device 38 to fix the unfixed toner image on the copy paper. The fixed copy paper is fed out on a copy receiving tray 48 by a pair of feeding rollers 44 and 46.

While the invention has been described with respect to a photo copy apparatus in which the original document is moved during a copying operation, this invention may be applied to a copying apparatus in which an optical device is moved during the copying operation.

According to this invention, in the copying apparatus where the copy paper cutting device 14 is operated at the time of the arrival of the original document or the optical device at a predetermined position, the movement of original document or the optical device is stopped at the occurence of the detection of the trailing edge of the copy paper by detecting means for detecting the trailing edge of the roll-like copy paper, the copy paper has been fed from the frame 2 completely without the operation of the copy paper cutting device after passage of at least the leading edge of the copy paper through the copy paper cutting device. Therefore the length of the last sheet of the copy paper is longer than the distance between each transport roller in the direction of the copy paper transport path to prevent jamming of the copy paper in the copy paper transport path.

Pins 134 and 136 are projected inwardly from side walls 130 and 132 of the frame 2 at a position downstream of a drive transport roller 66, with respect to a copying exposure direction 112. Engaging members 138 and 140 protrude at the leading portion of an original document manual feeding assembly 86 along the copying exposure direction 112 and have notches 142 and 144 opening downwardly. Engagement in notches 142 and 144 of the engaging members 138 by 140 and the pins 134 and 136 permit the original document manual feeding assembly 86 to be mounted removably on the frame 2. Further the original document manual feeding assembly 86 is rotatable around the pins 134 and 136 to maintain the mounted state as shown in FIG. 2. When the original document manual feeding assembly 86 is swung in a counterclock direction as viewed in FIG. 2 around the pins 134 and 136, the original document manual feeding assembly 86 is released by separation of each of a pair of transport rollers 56, 58; 60, 62; 66, 68.

There is provided a first detecting means S1 for detecting the trailing edge of the original document immediately downstream of the transport rollers 56 and 58 along the copying exposure direction 112. A second detecting means S2 for detecting the leading edge of the original document is placed downstream of the first detecting means S1 along the copying exposure direction 112 and upstream of the vicinity of the transport rollers 60 and 62. The first detecting means S1 comprises a photo generating element 146 afixed to the original document manual feeding assembly 86, and photo receiving element 148 arranged on the frame 2 at a position corresponding to the photo generating element 146. The second detecting means S2 comprises a corresponding photo generating element 150 and a photo receiving element 152.

Referring again to FIG. 2, there is provided a third detecting means S3 for detecting the leading edge of the copy paper 4 between the transport rollers 17 and 19 and the charging device 20 along the copy paper passageway 6. A fourth detecting means S4 is placed for detecting the trailing edge of the copy paper 4 between the exposure station 22 and the transport rollers 24 and 26. A fifth detecting means S5 is provided for detecting the trailing edge of the copy paper 4 in the vicinity of the trailing edge of the guide plate 8 along the tranport direction.

The original document is supplied from an original document entrance 54 along an original document insert cause 52 disposed on the top of the frame 2, passes along an original document passageway 50 through pairs of lower and upper transport rollers 56, 58 and 60 and 62, is guided above a scanning slit 64 via a pair of lower and upper transport rollers 66 and 68 and is fed onto an original document receiving tray 70. When the original document travels above the scanning slit 64, the original document image is focused on the copy paper placed at the exposure station 22 by means of an optical device 72. In the optical device 72, the light from an exposure lamp 76 having a mirror 74 passes toward the scanning slit 64 and is reflected by the original document and then reaches the exposure station 22 through a mirror 78, a mirror lense 80 and a mirror 82. The amount of the exposure light is ajustable by manual operation of a dial 84 attached a front panel of the frame 2.

On the top of the frame 2, the transport rollers 56, 60 and 66 are driven rotatively for transporting the original document. In the case where a single original document is copied, original document manual feeding assembly 86 is mounted on the top of the frame 2 as shown in FIG. 1. In this state, follower transport rollers 58, 62 and 68 are arranged in contact with the drive transport rollers 56, 60 and 66 to be driven immediately above the drive transport rollers 56, 60 and 66, thereby the resultant original document passageway 50 is formed. In the case where a plurality of copies are made of a single original document, a predetermined number of copies are achieved by presetting a counter dial 88 placed on the front panel of the frame 2 at the predetermined number.

Figure 16:
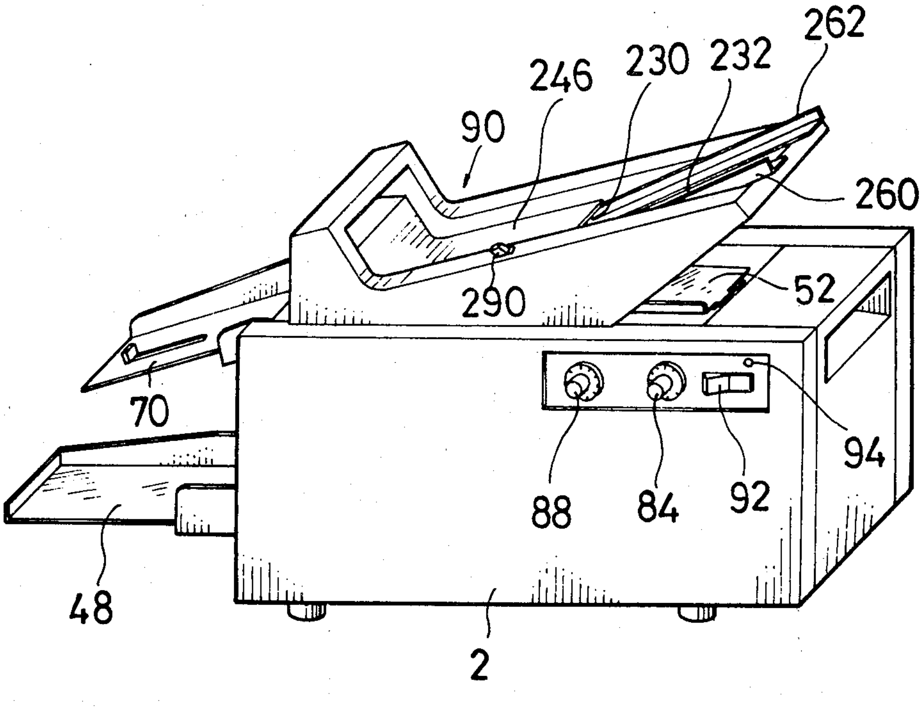
FIG. 16 is a perspective view of the copying apparatus with an original document automatic feeding assembly mounted on the top of the frame.

When it is required to copy automatically a plurality of original documents, an original document automatic feeding assembly 90 shown in FIG. 16 is mounted on the top of the frame 2, as an alternative to the original document manual feeding assembly 86, as described in detail hereinafter referrring to FIG. 16.

There is provided a power switch 92 on the front panel of the frame 2. The pilot lamp 336 (FIG. 6) is energized by turning on the power switch 92 to indicate that the power switch 92 is turned on and that insertion of an original document is necessary. The pilot lamp 336 is energized intermittently to indicate jamming of an original document or the copy paper 4 and the wearing out of the copy paper 4.

Figure 3:
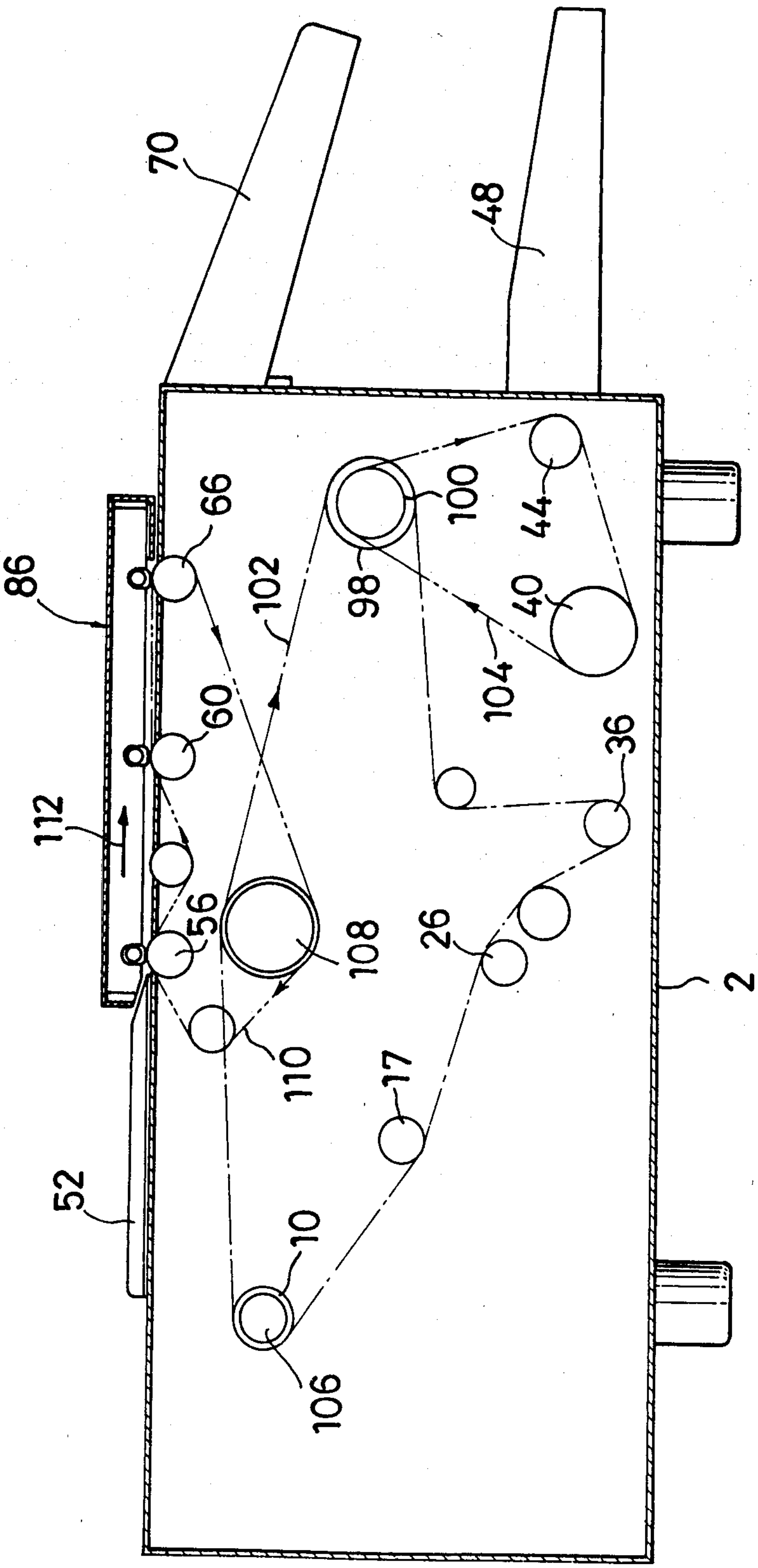
FIG. 3 is a schematic longitudinal sectional view of the rear side of the copying apparatus.

FIG. 3 is a simplified cross sectional view shown from the rear side of the copying apparatus. When the power switch 92 is turned on, a motor 96 (shown in FIG. 2) is driven. A sprocket wheels 98 and 100 are mounted coaxially on a rotary shaft of the motor 96. A chain 102 lapped on one sprocket wheel 98 drives the guide roller 36, transport rollers 26 and 17 and feeding roller 10. A chain 104 lapped on the other sprocket wheel 100 drives feed roller 44 and pressure roller 40. A feeding clutch 106 is provided between a rotary shaft of the feeding roller 10 and the sprocket 98 on which the chain 102 is lapped. The chain 102 is lapped on an input of a magnetic clutch 108 capable of being rotated in the forward direction or the reverse direction. A chain 110 lapped on the output of the magnetic clutch 108 causes drive transport rollers 56, 60 and 66 to rotate. The magnetic clutch 108 serves in the forward rotating state to transmit the rotating torque of the chain 102 to the chain 110 in the normal direction. Accordingly the original document is advanced at a relatively low speed in a copying exposure direction 112. In the reverse rotating state, the rotary torque of the chain 102 is transmitted via the magnetic clutch 108 to the chain 110 in a reverse direction, and the original document is returned at a relatively greater speed in a direction opposite to the copying exposure direction 112. In a disengaged state, the rotary torque of the chain 102 is not transmitted to the chain 110.

Drive transport rollers 56, 60 and 66 for transporting the original document rotate at an identical peripheral speed. The feeding roller 10, transport rollers 17 and 26, the guide roller 36, the pressure roller 40 and the feed roller 44 for carrying a copy paper 4 along the copy paper passageway 6 rotate at the same peripheral speed as the exposure speed.

Figure 4:
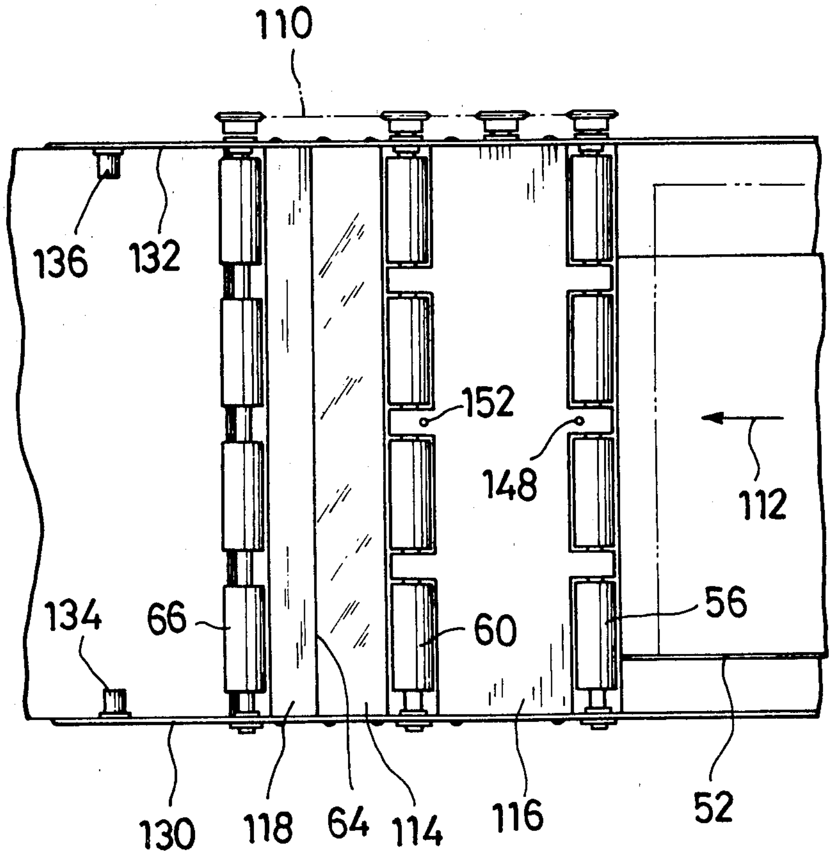
FIG. 4 is an enlarged plan view of the machine frame from which the original document manual feeding assembly has been removed.
Figure 5:
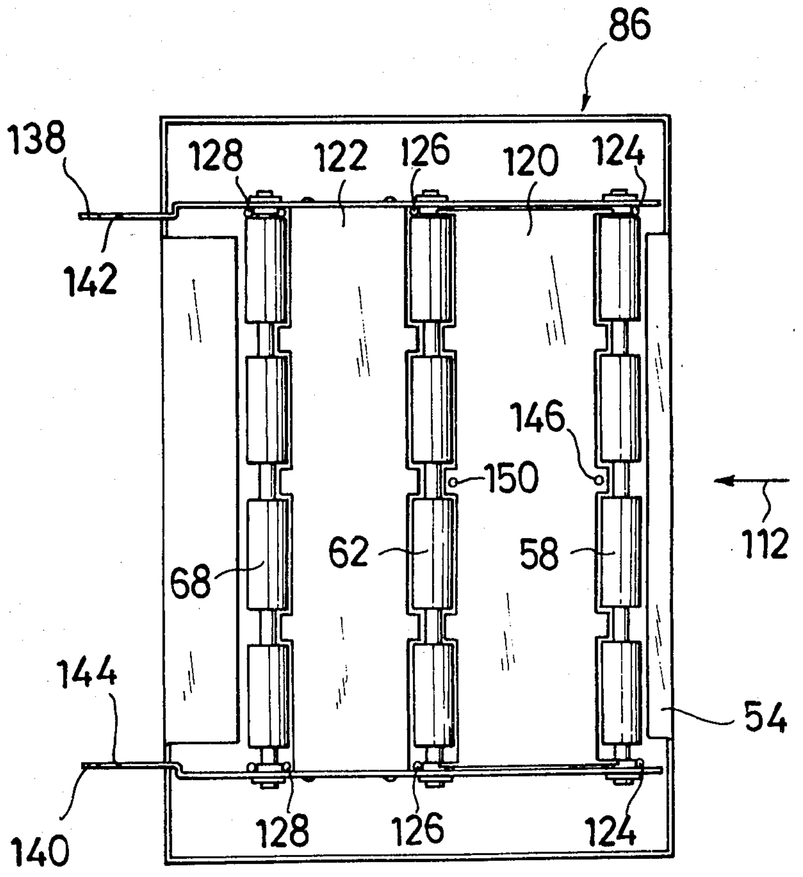
FIG. 5 is a bottom view of the original document manual feeding assembly.

FIG. 4 is a top plan view depicting a portion of the frame 2 when the original document manual feeding assembly 86 is detached from the frame 2. FIG. 5 is a bottom view of the original document manual feeding assembly 86. There is provided a transparent glass plate 114 on the scanning slit 64. Guide plates 116 and 118 are arranged on the top of the frame 2 between the transport rollers 56 and 60 and between the transport rollers 60 and 66, respectively. In the original document manual feeding assembly 86, a depressing plate 120, to cooperate with the guide plate 116 for nipping the original document, is situated between the follower transport rollers 58 and 60. A depressing plate 122 is situated similarly between the follower transport rollers 62 and 68. When the original document manual feeding assembly 86 is mounted on the frame 2, the follower transport rollers 58, 62 and 68 are spring biased toward the drive transport rollers 56, 60 and 66, respectively by means of springs 124, 126 and 128 attached to the original document manual feeding assembly 86, respectively.

Along the copy paper passageway 6, the distance from the feeding rollers 10 and 12 to the transport rollers 17 and 19, the distance from the transport rollers 17 and 19 to the transport rollers 24 and 26, the distance from the transport rollers 24 and 26 to the retaining member 32 and the guide roller 36, the distance from the retaining member 32 and the guide roller 36 to the pressure roller 40 and 42, and the distance from the pressure rollers 40 and 42 to the feed out rollers 44 and 46 are shorter than the distance l1 from the cut position P1, whereat paper cutting by the copy paper cutting device 14 occurs, to the third detecting means S3. The distance l2 between the first and second detecting means S1 and S2 is equal to the distance l1 from the cut position P1 to the third detecting means S3 (l1=l2). The distance l3 from the second detecting means S2 to the transport rollers 66 and 68 is chosen to be longer than the distance l4 between the third and fourth detecting means S3 and S4. The distance l7 between the second detecting means S2 and the scanning slit 64 is chosen to be equal to the distance l8 between the third detecting means S3 and the exposure station 22. The distance l9 from the fifth detecting means S5 to the cut position P1 along the copy paper passageway 6 is greater than or equal to each of the distance from the feeding rollers 10 and 12 to the transport rollers 17 and 19, the distance from the transport rollers 17 and 19 to the transport rollers 24 and 26, the distance from the transport rollers 24 and 26 to the retaining member 32 and the guide roller 36, the distance from the retaining member 32 and the guide roller 36 to the pressure rollers 40 and 42, and the distance from the pressure rollers 40 and 42 to the feed rollers 44 and 46. The distance l10 from the fifth detecting means S5 to the feeding rollers 10 and 12 is greater than or equal to the distance l11 from the cutting position P1 to the transport rollers 17 and 19 (l10≧l11).

Figure 6:
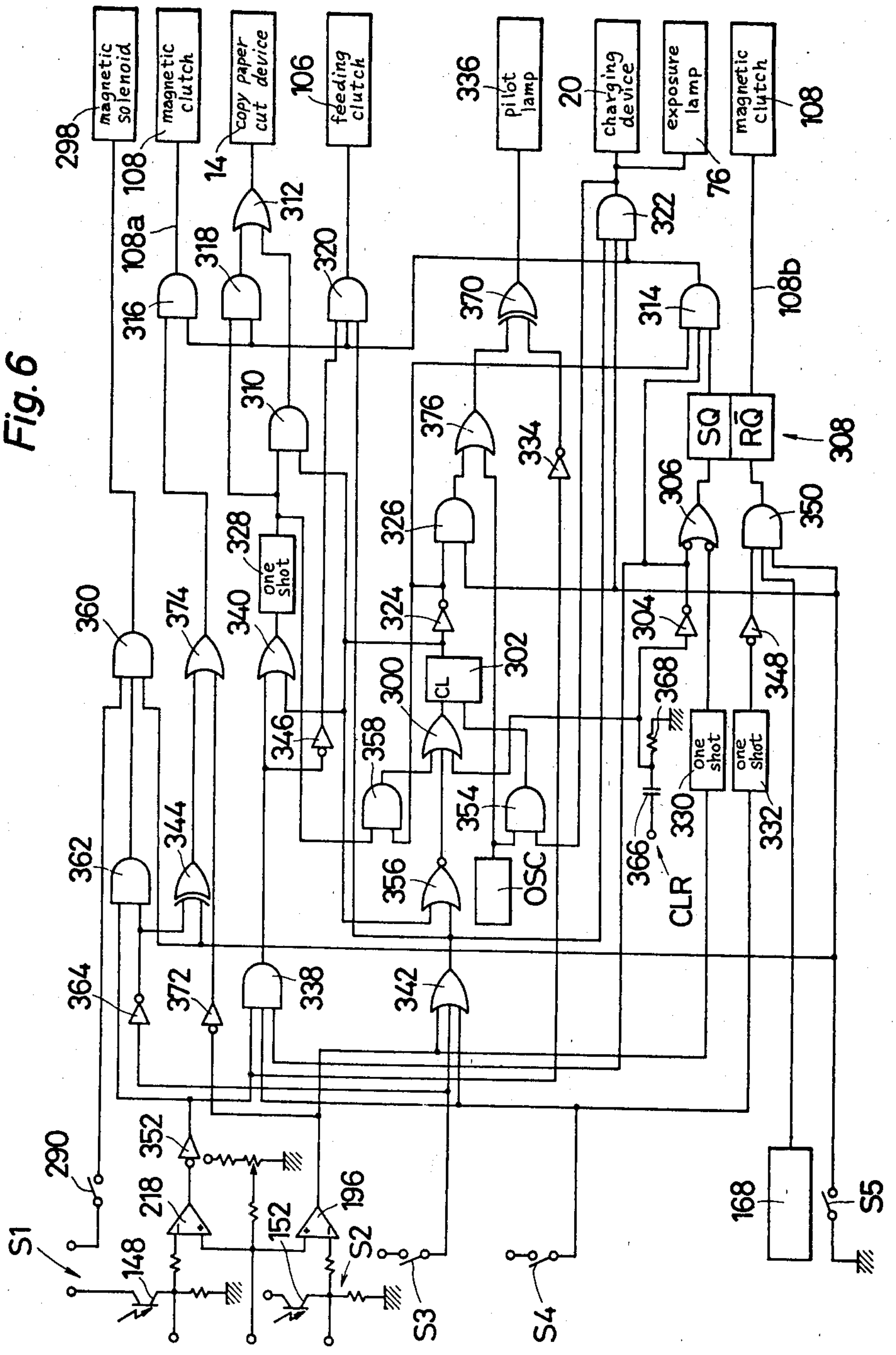
FIG. 6 is a circuit diagram of a control system of the copying operation.
Figure 7:
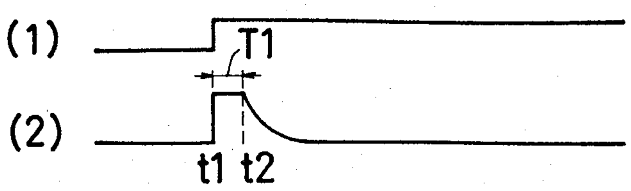
FIG. 7 is performance wave-form of a clear circuit of the system of FIG. 6.

Referring to FIG. 6, there is shown an electric circuit for a controlling each step of a copying operation. This electric circuit comprises a clear circuit CLR, the operation of which is shown in FIG. 7. The clear circuit CLR is formed of a capacitor 366 and a resistor 368, and generates an output having a high level after activation of the power switch 92 at t1 as shown in FIG. 7 (1) and is maintained at this high level during the interval T1 from time t1 to t2. The clear circuit CLR in turn generates a low level output after the trailing edge t2 of the interval. The wave form of the output from the clear circuit CLR is shown in FIG. 7 (2).

Figure 8:
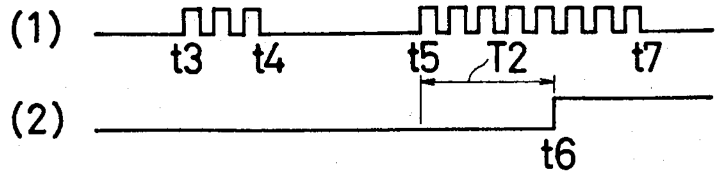
FIG. 8 is a wave-form grpah of the counter 302 therein.

FIG. 8 shows wave forms of a counter 302 shown in FIG. 6. The counter 302 is responsive to an input signal shown in FIG. 8 (1) and provides an output, the wave form of which is shown in FIG. 8 (2). The timing period T2 of this counter 302 is 7.5 seconds in this embodiment. The output signal from the counter 302 turns from low level to high level when the input pulse to the counter 302 is maintained over the timing period T2. When the period of the input pulse is shorter than the timing period T2 from time t3 to t4, the output signal from the counter 302 is maintained at the low level. When the input pulse to the counter 302 is maintained over the timing period T2 from time t5 to t7, the output signal from the counter 302 turns from low level to high level at the time t6 which is the timing period T2 later than the time t5. The counter 302 is cleared when a high level signal is supplied to a clear terminal CL of the counter 302.

Figure 9:
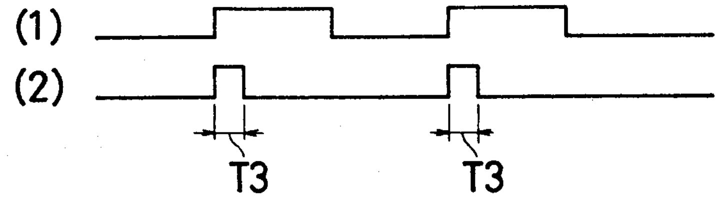
FIG. 9 is a wave-form graph of the one shot 328 therein.

FIG. 9 shows wave forms of one shot 328 shown in FIG. 6. This one shot 328 provides high level output signals during the period T3 at the time of a leading edge of an input signal to the one shot 328 shown in FIG. 9 (1). This interval T3 is chosen so that the copy paper cutting device 14 can positively cut the copy paper.

Figure 10:
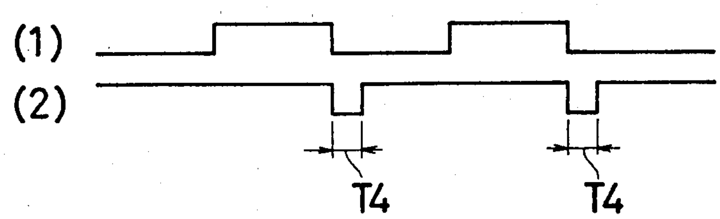
FIG. 10 is a wave-form graph of the one shot 330 therein.

FIG. 10 shows wave forms of one shot 330 shown in FIG. 6. This one shot 330 supplies low level signals during the period T4 shown in FIG. 10 (2) at the time of a trailing edge of an input signal shown in FIG. 10 (1).

Figure 11:
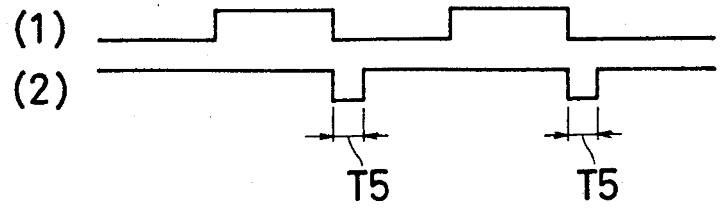
FIG. 11 is a wave-form graph of the one shot 332 therein.

FIG. 11 shows wave forms of one shot 332 shown in FIG. 6. This one shot 332 is responsive to the trailing edge of the input signal shown in FIG. 11 (1) and provides a low level output signal, the relation of which is T5 as shown in FIG. 11 (2).

Figure 12:
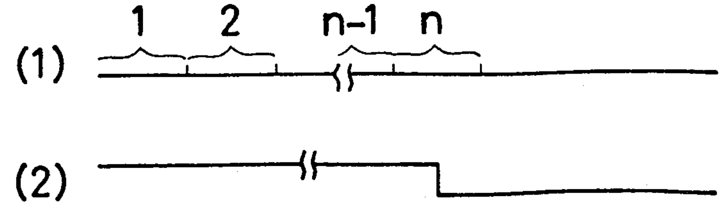
FIG. 12 is a wave-form graph of the counter 168 therein.

FIG. 12 shows wave forms of a counter 168. This counter 168 is responsive to the operation of the copy paper cutting device 14 and provides an output signal which turns from high level to low level when the copy paper cutting device 14 operates in the n-th copying step in the case where the indication of the counter 168 is for example n as in FIG. 12 (2). When n equals 1, the output from the counter 168 maintains a high level to perform a single of copying operation.

Figure 13:
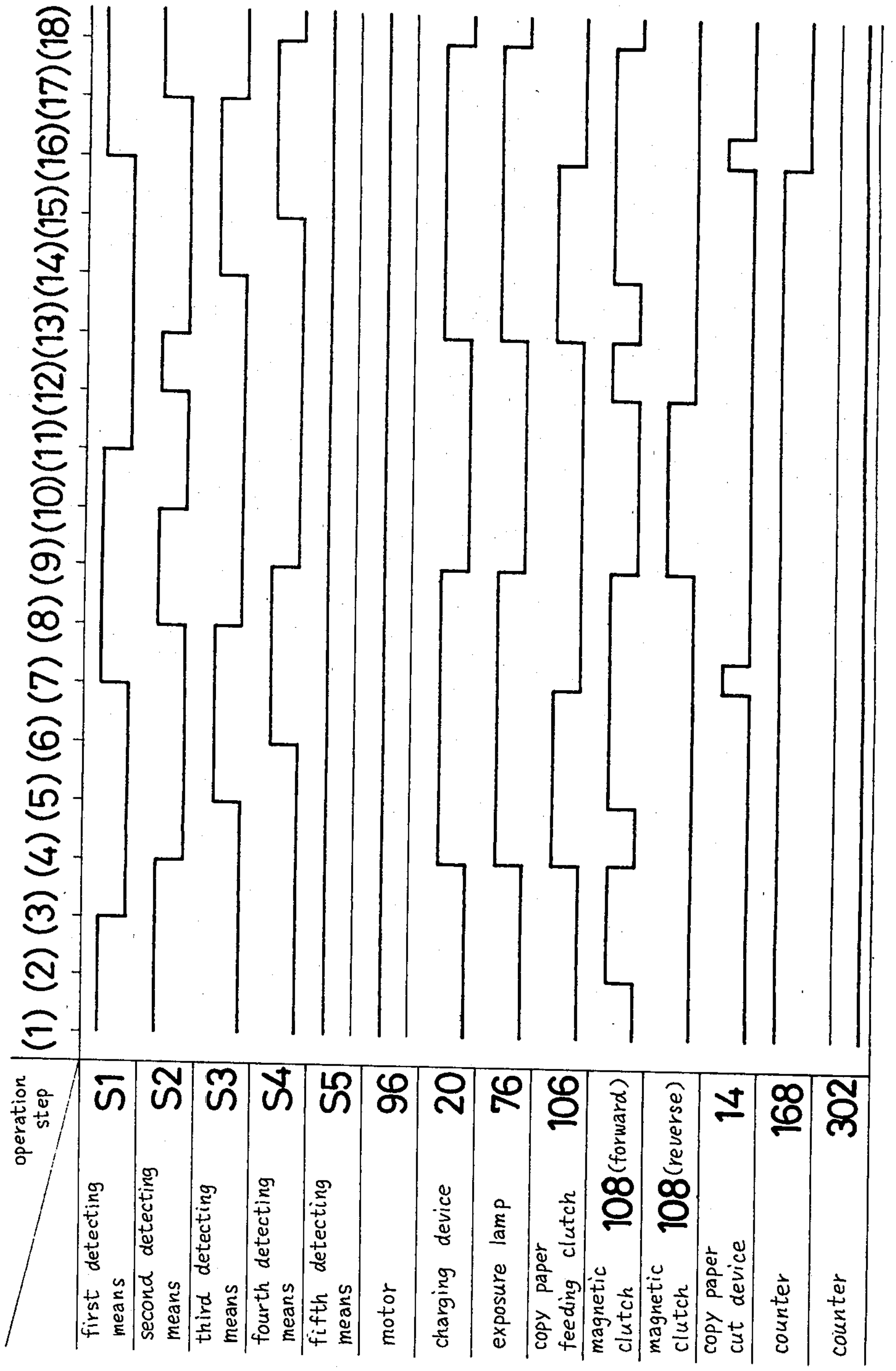
FIG. 13 is a graph showing time lapse of each of the operation steps in the case of achieving two copies.

FIG. 13 shows time lapse of operation in each operation step (1) or (18) (discussed below) of the electric circuit shown in FIG. 6. The first detecting means S1 provides an output from the photo detecting element 148 and the second detecting means S2 provides an output from the photo detecting element 152. Operation states of all components are indicated by high level except the first and second detecting means S1 and S2, and the fifth detecting means S5.

OPERATION STEP (1)

Upon closure of the power switch 92 for a copying operation, the motor 96 is operated and clear circuit CLR provides an output which is high level during time period T1. This high level signal is turned into a low level signal by NOT gate 304 and this resultant low level signal is supplied to INVERT-OR gate 306. Since the original document is not supplied, the photo detecting element 152 of the second detecting means S2 is responsive to light from the photo generating element 150 and remains on, and thus the output from the detecting element 152 is high level. Accordingly comparing circuit 196 provides a low level output and one shot 330 provides a low level output the duration of which is T4. This low level signal is supplied to the INVERT-OR gate 306 and the output of the INVERT-OR gate 306 is high level and the flip-flop 308 is set. The output from the flip-flop 308 is supplied to AND gate 314, and a reset output is supplied to a terminal 108*b* of the magnetic clutch 108 to perform an inverting operation. Since the flip-flop 308 is set, the reset output is low level and the magnetic clutch 108 is turned to reverse. The flip-flop 308 remains in the set state after the lapse of time duration T1. The low level signal from the NOT gate 304 is supplied to the AND gate 314 and thus the outputs from AND gates 316, 318, 320 and 322 which are responsive to the output from the AND gate 314 are turned to low level. The low level signal from the AND gate 316 is supplied to a terminal 108*a* of the magnetic clutch 108 and thus the magnetic clutch 108 does not rotate and is off. The feeding clutch 106 is responsive to the low level signal from the AND gate 320 and is in the off state. The low level signal from the AND gate 322 operates the charge device 20 and exposure lamp 76. The counter 302 supplies a low level signal to AND gate 310 and thus the output from the AND gate 310 is low level. The low level signal from the AND gates 310 and 318 is supplied via OR gate 312 to the copy paper cutting device 14 to operate the copy paper cut device 14.

The low level signal from the counter 302 is inverted to high level by NOT gate 324 and this high level signal is supplied to AND gate 326. The fifth detecting means S5 is responsive to the copying data and thus is open, accordingly the fifth detecting means S5 supplies a high level signal to the AND gate 326. This results in the output from the AND gate 326 being high level. This high level output is supplied to one input terminal of EXCLUSIVE-OR gate 370 via OR gate 376. Since the original document is not inserted, the photo detecting element 148 is responsive to the light from the photo generating element 146 and thus is closed. Accordingly the output from the photo detecting means 148 is high level and the output from comparing circuit 218 is the low level. This low level signal from the comparing circuit 218 is inverted to high level by NOT gate 352 and further is inverted to low level by NOT gate 334. This low level output signal from the NOT gate 334 is supplied to the other input terminal of the EXCLUSIVE-OR gate 370. This results in the output signal from the EXCLUSIVE-OR gate 370 being high level and supplied to the pilot lamp 336. Accordingly the pilot lamp 336 is turned on and indicates that the power switch 92 is on.

Oscillating circuit OSC is connected to the OR gate 376. The pilot lamp 336 is intermittently energized corresponding to the pulse period of the output from the oscillating circuit OSC when the output from the NOT gate 324 is low, i.e. the output from the counter 302 is high level and the output from the fifth detecting means S5 is high level, or when the output from the counter 302 is low level and the output from the fifth detecting means S5 is low level. This state occurs. (a) in the case where the original document or the copying paper is jammed or (b) in the case where the copying paper has been fed out.

OPERATION STEP (2)

After the lapse of time T1 of clear circuit CLR, the output from the clear circuit CLR is low level and thus the output from the NOT gate 304 is high level. The high level signal from the NOT gate 304 is supplied to the AND gate 314 and the INVERT-OR gate 306. In the beforementioned operation step (1), after the lapse of time T4 the output from the one shot 330 is high level and thus the output from the INVERT-OR gate 306 is low level and the flip-flop 308 is maintained to be set. Further the output from the counter 302 is low level and thus a high level signal from the NOT gate 324 is supplied to the AND gate 314. Accordingly the output from the AND gate 314 is high level. The output from the comparing circuit 196 corresponding to the second detecting means S2 is low level and the output is inverted to high level by NOT gate 372 and thus a high level signal is supplied via OR gate 374 to the AND gate 316. The output from the AND gate 316 is high level and the magnetic clutch 108 performs rotation in a proper direction. Since the output from the counter 302 is low level, the output from the AND gate 310 is low level. The output from the fourth detecting means S4 is low level and thus the output from the AND gate 338 is low level. Since the output from the counter 302 is low level, the output from OR gate 340 is low level and the output from the one shot 328 is low level. Accordingly the AND gate 318 receives the output from the one shot 328 and supplies a low level output. Therefore the output from the OR gate 312 is low level and the copying paper cutting device 14 is stopped. The comparing circuit 196 corresponds to the second detecting means S2 and supplies a low level output, the third detecting means S3 and the fourth detecting means S4 supply low level outputs, therefore the output from OR gate 342 is low level. Accordingly the output from the AND gate 320 is low level and the feeding clutch 106 remains off. The AND gate 322 receives the low level signal from the OR gate 342 and supplies a low level output signal. This results in that the charging device 20 and the exposure lamp 76 are operated. Since the output from the counter 302 remains low level, the output from the NOT gate 324 is high level and the pilot lamp 336 is on.

OPERATION STEP (3)

There is described hereinafter the operation of the counter dial 88 caused to preset the counter 168 to obtain two copying operations. In this case let us assume that the length of the original document is larger than the distance l5 (=l1+l4) from the cut position P1 to the fourth detecting means S4 and the length of the original document is smaller than the multiple original document feeding speed which is equal to the exposure speed and the timing period T2 of the counter 302. At first the leading edge of the original document is detected by the first detecting means S1. When the leading edge of the original document reaches the first detecting means S1, the light from the photo generating element 146 to the photo detecting element 148 is shut off and the output from the comparing circuit 218 is high level and the output is inverted to low level by the NOT gate 352. The low level output signal from the NOT gate 352 is inverted to high level by the NOT gate 334. Therefore the output from the EXCLUSIVE-OR gate 370 is low level and the pilot lamp 336 is turned off. The low level signal from the NOT gate 352 is supplied to the AND gate 338. The output from the AND gate 338 is low level and the output from the counter 302 is low level. Therefore the output from the OR gate 340 is low level and the output from the one shot 328 is low level. Accordingly the output from the AND gates 310 and 318 is low level and thus the output from the OR gate 312 is low level. Accordingly the copying paper cutting device 14 remains to be unabled. The magnetic clutch 108, the feeding clutch 106, the charging device 20 and the exposure lamp 76 remain in the same state as in the aforementioned operation step (2).

OPERATION STEP (4)

Assume that the original document is further fed in the copying exposure direction 112, the leading edge of the original document reaches the second detecting means S2 and the light from the photo generating element 150 to the photo detecting element 152 is shut off. In this case since the length of the original document is larger than the distance l2, the original document is detected by the first detecting means S1. The high level signal from the comparing circuit 196 which corresponds to the second detecting means S2 is inverted to low level by the NOT gate 372 and the low level signal is supplied to the OR gate 374. The output from the third detecting means S3 is low level and thus the output from the NOT gate 364 is high level and this high level signal is supplied to the EXCLUSIVE-OR gate 344. The high level signal from the fifth detecting means S5 is supplied to the EXCLUSIVE-OR gate 344. Accordingly the output from the EXCLUSIVE-OR gate 344 is low level and this low level signal is supplied to the OR gate 374. Accordingly the output from the OR gate 374 is low level and the magnetic clutch 108 stops rotation in a proper direction. When the leading edge of the original document is detected by the second detecting means S2, the original document stops movement in the copying exposure direction 112 and the leading edge of the original document remains stopped at the position of the second detecting means S2. The copy paper cutting device 14 remains in the same state as in the aforementioned operation step (3). Since the output from the AND gate 338 is low level as in the operation step (2), the output from the NOT gate 346 is high level. The output from the comparing circuit 196 which corresponds to the second detecting means S2 and thus the output from the OR gate 342 is high level. If the output from the comparing circuit 196 which corresponds to the second detecting means S2 changes to level from low level, the output from the INVERT-OR gate 306 remains low level and thus the flip-flop 308 is set. The result in that the output from the AND gate 314 remains high level during the operation steps (3), (4). The output from the AND gate 320 is high level and the feeding clutch 106 is on. The copy paper 4 begins to be fed. The output from the comparing circuit 196 which corresponds to the second detecting means S2 is high level. The high level signal is supplied to the AND gate 322 via the OR gate 342. The output from the AND gate 314 is high level as described hereinbefore. The output from the fifth detecting means S5 is high level, and thus the output from the AND gate 322 is high level. Accordingly the charging device 20 and the exposure lamp 76 are operated. The high level signal from the AND gate 322 is supplied to the AND gate 354. The output signal having a constant frequency from the oscillating circuit OSC as shown in FIG. 8 (1) is supplied to the counter 302 and the count operation is stored in the counter 302.

OPERATION STEP (5)

When the leading edge of the copy sheet paper reaches the third detecting means S3, the output from the third detecting means S3 is high level and thus the output from the NOT gate 364 is low level. The output from the EXCLUSIVE-OR gate 344 is high level. Accordingly the output from the OR gate 374 is high level and is supplied to the AND gate 316. Since the output from the AND gate 314 is high level, the output from the AND gate 316 is high level and the magnetic clutch 108 rotates in a proper direction. The original document begins to be fed again with the leading edges of the copy paper and the original document congruent with each other, and the copy paper and the original document are fed at the same exposure speed.

OPERATION STEP (6)

When the leading edge of the copy paper reaches the fourth detecting means S4, the fourth detecting means S4 provides a high level output signal. Since the output from the NOT gate 352 is low level, the output from the AND gate 338 is low level and the output from the OR gate 342 is high level, which is the same as in the operation step (4). Therefore the copy paper cutting device 14 is stopped and the charging device 20 and the exposure lamp 76 are operated and the magnetic clutch 108 is rotated in the forward direction. The input terminal 108*b* for the reverse rotation of the magnetic clutch 108 remains at low level. Since the output from the fourth detecting means S4 changes from low level to high level, the one shot 332 is not activated, therefore the output from the one shot 332 remains to be high level. Accordingly the output from the NOT gate 348 is low level and the output from the AND gate 350 is low level and the flip-flop 308 remains to be set.

The output from the AND gate 338 remains low level during operation steps (1) and (2). Then the output from the NOT gate 346 is high level. Accordingly the output from the AND gate 320 is high level and the feeding clutch 106 is in the ON state and the copy paper is fed.

OPERATION STEP (7)

When the trailing edge of the original document moves through the first detecting means S1, the light from the photo generating element 146 reaches the photo detecting element 148 and the output from the photo detecting element 148 is high level. Correspondingly the output from the comparing circuit 218 is low level and the output signal is inverted to high level by the NOT gate 352. Therefore the output from the AND gate 338 is high level. The output from the AND gate 338 is inverted to low level by the NOT gate 346. Accordingly the output from the AND gate 320 is low level and the feeding clutch 106 is in the OFF state. The high level output signal from the AND gate 338 causes the OR gate 340 to supply a high level output. As shown in FIG. 9 (2) the one shot 328 supplies a high level signal during the time period T3 and this high level output signal from the one shot 328 is supplied to the AND gate 318. The output from the AND gate 314 remains high level as in the operation step (6). Accordingly the output from the AND gate 318 is high level and this high level signal operates the copy paper cutting device 14 via the OR gate 312 to cut the copy paper.

As the trailing edge of the original document reaches the first detecting means S1, at the same time when the feeding of the copy paper stops, the copy paper cutting device 14 cut the copy paper. The length of the copy paper cut is equal to the length of the original document because (a) when the leading edge of the original document is at the second detecting means S2, the leading edge of the copy paper reaches the third detecting means S3, accordingly the original document and the copy paper are fed at the exposure speed at the same time; (b) when the trailing edge of the original document reaches the first detecting means S1, the copy paper is cut; (c) the distance l1 equals the distance l2.

The high level signal from the one shot 328 is coupled to the AND gate 358. The low level output signal from the counter 302 is inverted to high level by the NOT gate 324. The output from the NOT gate 324 is supplied to the AND gate 358. Therefore the output from the AND gate 358 is high level. This high level output signal is coupled to the clear terminal CL of the counter 302 via the OR gate 300 to clear the counter 302.

The magnetic clutch 108 performs a forward rotating operation, and the charging device 20 and the exposure lamp 76 are operated and terminal 108*b* for reverse rotation remains low level. This state is the same as in the operation step (6).

OPERATION STEP (8)

When the trailing edge of the original document reaches the second detecting means S2, simultaneously the trailing edge of the copy paper having an equal length reaches the third detecting means S3. The input terminal 108*a* for forward rotation of the magnetic clutch 108 is high level, the copy paper cutting device 14 is stopped and the feeding clutch 106 is in the OFF state. The light from the photo generating element 150 of the second detecting means S2 reaches the photo detecting element 152, therefore the output from the photo detecting element 152 is high level and the output from the comparing circuit 196 is low level, the one shot 330 supplies a low level output signal during the time period T4. The high level output signal from the INVERT-OR gate 306 maintained during the time period T4 causes the flip-flop 308 to be set. The charging device 20 and the exposure lamp 76 are operated and the input terminal 108*b* for reverse rotation of the magnetic clutch 108 is low level.

OPERATION STEP (9)

When the trailing edge of the copy paper reaches the fourth detecting means S4, the output from the fourth detecting means S4 is low level. The output from the third detecting means S3 is low level and the output from the comparing circuit 196 corresponding to the second detecting means S2 is low level. Accordingly the output from the OR gate 342 is low level. This low level output signal is supplied to the NOR gate 356. The low level signal from the counter 302 is coupled to the NOR gate 356 and the output from the NOR gate 356 is high level. This high level signal is supplied to the clear terminal CL of the counter 302 via the OR gate 300 to clear the counter 302. The output from the AND gate 322 to which the low level signal from the OR gate 342 is supplied is low level, and the charging device 20 and the exposure lamp 76 are stopped.

The output from the fourth detecting means S4 changes from high level to low level, therefore the output from the one shot 332 is low level during the time period T5. This low level output signal is inverted to high level by the NOT gate 348. Since the outputs from the counter 168 and the fifth detecting means S5 are high level, the output from the AND gate 350 is high level, and the flip-flop 308 is reset. This reset state is maintained after the lapse of the time period T5. The output from the AND gate 314 receiving the set output is low level. The outputs from the AND gates 316, 318 and 320 are low level. Therefore the magnetic clutch 108 does not perform forward rotation and the feeding clutch 106 is in the OFF state. The output from the counter 302 is low level and thus the output from the AND gate 310 is low level. Accordingly the output from the OR gate 312 is low level and the copy paper cutting device 14 is stopped.The terminal 108*b* for reverse rotation of the magnetic clutch 108 receives the reset output of high level from the flip-flop 308. Therefore the magnetic clutch 108 performs reverse rotation. The original document is returned at relatively higher speed in the reverse direction of the copying exposure direction 112. In this operation, the trailing edge of the original document is moving above the scanning window 64 and the distance l3 between the second detecting means S2 and the transfer rollers 66 and 68 is larger than the distance l4 between the third and fourth detecting means S3 and S4, therefore the original document is moved between transfer rollers 66 and 68. The copy paper continues to be fed along the copy paper transfer path 6 and is fed out onto the copy tray 48. Accordingly the first copying operation is performed.

OPERATION STEP (10)

When the original document is returned in the reverse direction of the copying exposure direction 112 and the trailing edge (or the leading edge in the returning step) of the original document reaches the second detecting means S2, the light from the photo generating element 150 to the photo detecting element 152 is shut off. Thereby the output from the photo detecting element 152 is low level, correspondingly the output from the comparing circuit 196 is high level. The output from the one shot 330 is high level and the output from the INVERT-OR gate 306 is low level and the flip-flop 308 remains in the reset state. The outputs from the AND gates 316, 318, 320 and 322 are low level as in the operation step (9). Therefore the magnetic clutch 108 does not rotate in the forward direction, the feeding clutch 106 is in the OFF state and the charging device 20 and the exposure lamp 76 are stopped. Since the output from the counter 302 is low level, the output from the AND gate 310 is low level. Accordingly the output from the OR gate 312 is low level. Therefore the copy paper cutting device 14 is stopped. The terminal 108*b* for reverse rotation of the magnetic clutch 108 receives the reset output of high level from the flip-flop 308 and the original document remains being fed in the reverse direction of the copying exposure direction 112.

OPERATION STEP (11)

When the trailing edge of the original document reaches the first detecting means S1, the light from the photo generating element 146 to the photo detecting element 148 is shut off and thus the output from the photo detecting element 148 is low level. Accordingly the output from the comparing circuit 218 is high level. This high level output signal is inverted to low level by the NOT gate 352. The output from the AND gate 338 remains low level and the output from the OR gate 312 is low level. The flip-flop 308 remains in the reset state. Therefore the magnetic clutch 108 remains to be in the reverse rotating operation, the copy paper cutting device 14 is stopped and the feeding clutch 106 is in the OFF state, as in the operation step (10). The charging device 20 and the exposure lamp 76 are stopped.

OPERATION STEP (12)

When the leading edge (or the trailing edge in the returning operation step (10)) of the original document moves through the second detecting means S2, the light from the photo generating element 150 passes to the photo detecting element 152, the output from the photo detecting element 152 is high level and the output from the comparing circuit 196 is low level. The output from the one shot 330 is low level during the time period T4. Therefore the high level output signal from the INVERT-OR gate 306 causes the flip-flop 308 to be set. This high level output signal from the INVERT-OR gate 306 is maintained during the time period T4, after the lapse of the time period T4 during which the flip-flop 308 is set, this set state is maintained. The magnetic clutch 108 receives the low level signal at the terminal 108*b* for reverse rotation, therefore the reverse rotating operation is commenced. The low level output from the comparing circuit 106 which corresponds to the second detecting means S2 is inverted to high level by the NOT gate 372. This high level signal is supplied to the AND gate 316 via the OR gate 374. Since the flip-flop 308 is set, the output from the AND gate 314 is high level and therefore the output from the AND gate 316 is high level. Magnetic clutch 108 is informed to rotate in the forward direction. Since the original document is being returned at a relatively higher speed in the reverse direction of the copying exposure direction 112, when the magnetic clutch 108 is changed from the reverse rotating state to the forward the rotating state, the original document is fed in the copying exposure direction 112 after the original document is fed in the reverse direction of the copying exposure direction 112. In this operation, the copy paper cutting device 14, the feeding clutch 106, the charging device 20 and the exposure lamp 76 are maintained to be stopped as in the aforementioned operation step (11).

OPERATION STEP (13)

When the original document is forwarded in the copying exposure direction 112 and the leading edge of the original document reaches the second detecting means S2, the light from the photo generating element 150 to the photo detecting element 152 is shut off, therefore the output from the photo detecting element 152 is low level, accordingly the output from the comparing circuit 196 is high level. This high level output signal is inverted to low level by the NOT gate 372. The output from the third detecting means S3 is low level and therefore the output from the NOT gate 364 is high level. The output from the fifth detecting means S5 is high level. Accordingly the output from the INVERT-OR gate 344 is low level. Therefore the output from the OR gate 374 is low level and is supplied to the AND gate 316 to cause the magnetic clutch 108 to stop the forward rotation. The output from the AND gate 338 remains low level as in the aforementioned operation step (11). Therefore the output from the NOT gate 346 is high level. In spite of the fact that the output from the comparing circuit 196 changes from low level to high level, the output from the one shot 330 remains high level, therefore the flip-flop 308 is remains in the set state. The output from the AND gate 314 remains high level as in the operation step (12). The output from the AND gate 320 is high level and the feeding clutch 106 is in the ON state. In such state, the copy paper begins to be fed. The OR gate 342 receives the high level signal from the comparing circuit 196 and supplies a high level output. The outputs from the fifth detecting means S5 and the AND gate 314 are high level, therefore the output from the AND gate 322 is high level. Accordingly the charging device 20 and the exposure lamp 76 are enabled to operate. The copy paper cutting device 14 remains stopped. The low level reset output from the flip-flop 308 is supplied to the terminal 108*b* for reverse rotation of the magnetic clutch 108, therefore the magnetic clutch 108 does not perform reverse rotation and is in the OFF state. Accordingly the leading edge of the original document is maintained stopped at the position of the second detecting means S2.

OPERATION STEP (14)

The copy paper begins to be fed in the aforementioned operation step (13) and the leading edge of the copy paper reaches the third detecting means S3. The leading edge of the original document and the leading edge of the copy paper are synchronized, and the original document and the copy paper begin to be fed in the same manner as in the operation step (5).

OPERATION STEP (15)

The leading edge of the copy paper reaches the fourth detecting means S4. This operation is in the same manner as in the operation step (6).

OPERATION STEP (16)

The trailing edge of the original document passes through the first detecting means S1, therefore the feeding clutch 106 is in the OFF state in the same manner as in the aforementioned operation step (7) and the copy paper is forced to be stopped and simultaneously the copy paper cutting device 14 is operated and the copy paper is cut.

OPERATION STEP (17)

When the trailing edge of the original document reaches the second detecting means S2, the trailing edge of the copy paper which has a length equal to the length to the original document reaches the third detecting means S3. Then the same operation as in the operation step (8) is performed.

OPEARATION STEP (18)

When the trailing edge of the copy paper reaches the fourth detecting means S4, the output from the fourth detecting means S4 changes from high level to low level. Therefore the output from the one shot 332 is low level during the time period T5 and this low level output is inverted to high level by the NOT gate 348. Since the output from the counter 168 is low level, the output from the AND gate 350 remains low level and the magnetic clutch 108 does not perform reverse rotation. The outputs from the comparing circuit 196 which corresponds to the second detecting means S2, the third detecting means S3 and the fourth detecting means S4 are low level, the output from the OR gate 342 is low level. Therefore the output from the AND gate 322 is low level. The charging device 20 and the exposure lamp 76 are stopped.

Figure 14:
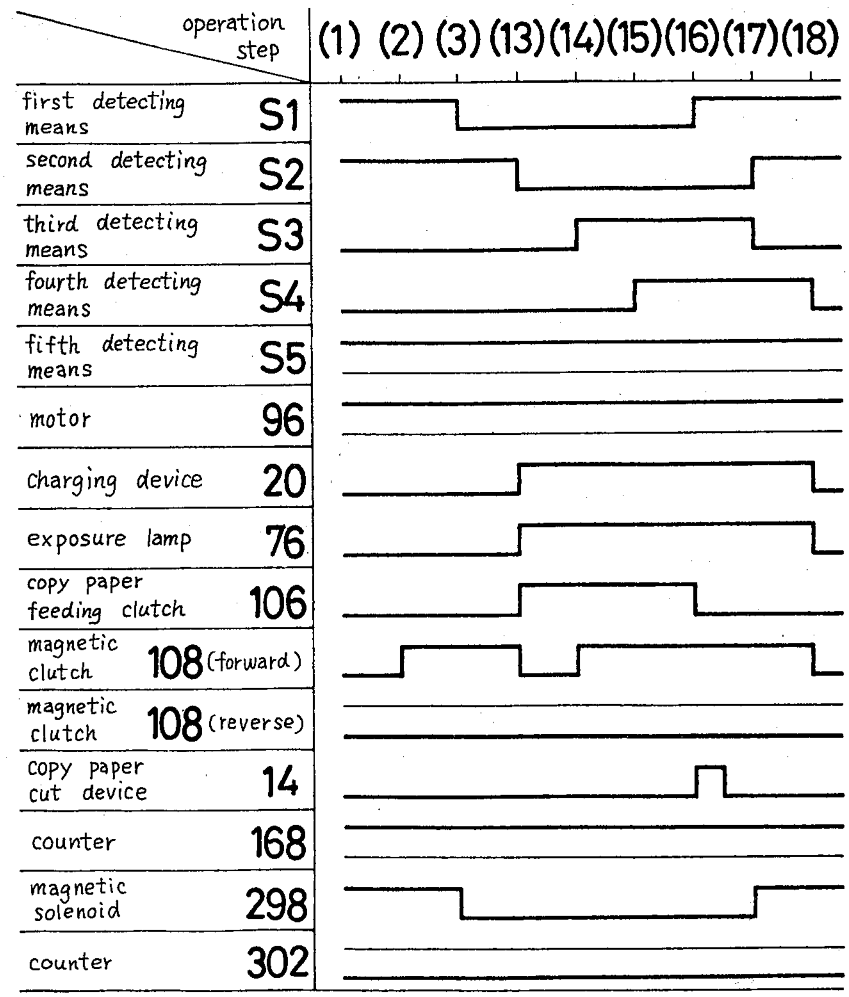
FIG. 14 is a graph showing a time lapse of each of the operation steps in the case of achieving a single copy.

FIG. 14 shows the time lapse in each operation step of the electric circuit shown in FIG. 6 when a single copy is performed, and in FIG. 14 each operation step is shown in the sequence of the time lapse with the use of the same reference numerals. A single copy is obtained by the completion of operation steps (1)-(3) and operation steps (13)-(18) in such order.

Figure 15:
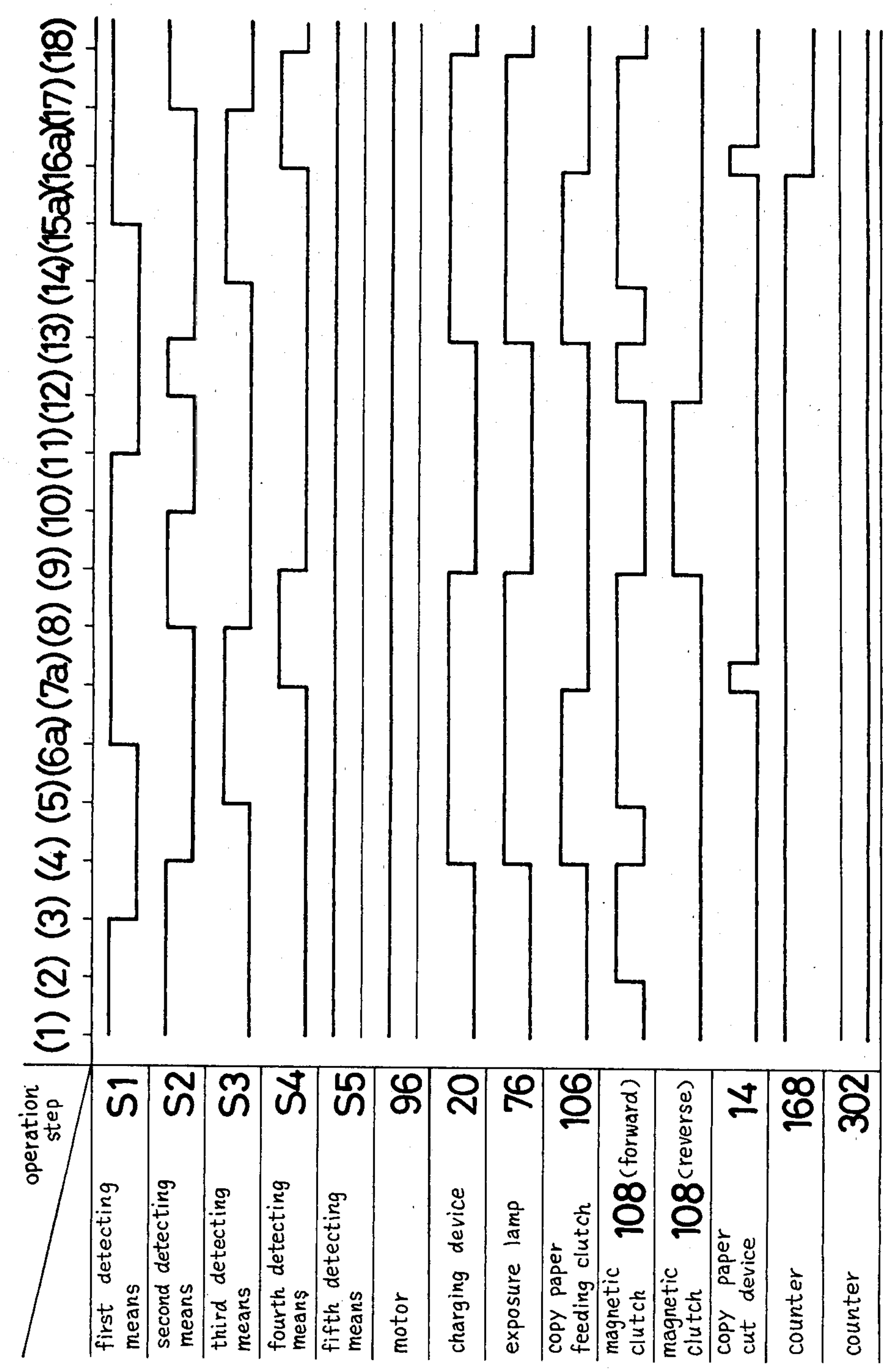
FIG. 15 is a graph showing a time lapse of each of the operation steps in the case of performing two copies where in the length of the original document is greater than a distance l6 and less than a distance l5.

FIG. 15 shows the time lapse of the operation steps when two copies are obtained in the case where the length of the original document is larger than the distance l6 (see FIG. 2) between the transfer rollers 56, 58; 60, 62. In this case the operation steps (1)-(5) are performed as is described concerning FIG. 13. In the operation step (5) the leading edge of the original document and the copy paper synchronize with each other at the position of the second and third detecting means S2, S3, the original document and the copy paper begin to be transferred simultaneously.

In the next operation step (6*a*), since the length of the original document is smaller than the distance l5, the trailing edge of the original document reaches the first detecting means S1 before the leading edge of the copy paper reaches the fourth detecting means S4. Therefore the light from the photo generating element 146 reaches the photo detecting element 148, and the output from the comparing circuit 218 is low level. At this time the fourth detecting means S4 is stopped, the output from the fourth detecting means S4 is low level and the output from the AND gate 338 is low level. Accordingly the outputs from the one shot 328 and the AND gates 310 and 318 are low level. The output from the OR gate 312 is low level and the copy paper cutting device 14 is stopped. Other operations are as same as in the operation step (5). Therefore the magnetic clutch 108 performs forward rotation, the feeding clutch 106 is in the ON state, and the charging device 20 and the exposure lamp 76 are operated. In the next operation step (7*a*), when the leading edge of the copy paper reaches the fourth detecting means S4, the output from the fourth detecting means S4 is high level. The output from the NOT gate 352 is high level as described concerning the operation step (*6a*). The low level output from the clear circuit CLR is inverted to high level by the NOT gate 304. Therefore the output from the AND gate 338 is high level. the output from the one shot 328 is high level during the time period T3, and this high level signal is supplied to the AND gate 318. The output from the AND gate 314 is high level as in the operation step (*6a*), the output from the AND gate 318 is high level and operates the copy paper cutting device 14 via the OR gate 312. The output from the AND gate 338 is high level as described hereinafter, the output from the NOT gate 346 is low level and the output from the AND gate 320 is low level, and cause the feeding clutch 106 is to be in the OFF state to stop feeding the copy paper. As operations are the same as in the operation step (*6a*), the magnetic clutch 108 performs the forward rotation, and the charging device 20 and the exposure lamp 76 are operated.

Therefore in this operation step (*7a*) the copy paper is cut so that the length of the copy paper 15 is larger than the length of the original document. This prevents the copy paper from being jammed in the copy paper transfer path 6.

After the compression of the operation steps (8)–(14), the operation step (15*a*) similar to the operation step (*6a*) and the operation step (16*a*) similar to the operation step (*7a*) are performed in that order and then the operation steps (17), (18) are performed. Two copies are obtained.

The operation is described hereinafter when jamming occurs in the path of transferring the original document in the copying exposure direction 112. (a) Let us assume that jamming of the original document occurs in the aforementioned operation steps (4) to (6) in FIG. 13, that is, the leading edge of the original document passes through the second detecting means S2, the trailing edge of the original document does not pass through the first detecting means S1. In this case the copy paper is being transferred in the copy paper transferring path 6. The light from the photo detecting element 152 is shut off by the original document, and the output from the comparing circuit 196 corresponding to the photo detecting element 152 is high level.

Since the output from the fifth detecting means S5 is high level, and the flip-flop 308 remains set, the output from the AND gate 314 is high level. The output from the AND gate 322 is high level and is supplied to the AND gate 354. The output signal from the oscillating circuit OCS having a constant frequency is formed into pulses via the AND gate 354 and is supplied to the counter 302. When the original document is jammed, pulses from the AND gate 354 are maintained supplied into the counter 302. When pulses are maintained supplied into the counter 302 during the time period T2, the output from the counter 302 is high level as shown in FIG. 8. The high level output from the counter 302 is coupled to the AND gate 310. The high level signal from the counter 302 is supplied to the one shot 328 via the OR gate 340 and therefore the one shot 328 provides high level signal. The output from the AND gate 310 is high level and operates the copy paper cutting device 14 via the OR gate 312. Therefore in the case where the trailing edge of the original document does not reach the first detecting means S1, the copy paper is cut. The cut copy paper is transferred along the copy paper transfer path 6 and is fed out onto the copy tray 48.

The high level output from the counter 302 is inverted to low level by the NOT gate 324. The output from the AND gate 314 is low level, accordingly the outputs from the AND gates 316, 320, 322 are low level. Therefore the magnetic clutch 108 does not perform forward rotation. The feeding clutch 106 is in the OFF state, and stops feeding of the copy paper. At the same time the charging device 20 and the exposure lamp 76 are stopped. The OR gate 376 receives the low level signal from the AND gate 326 and the signal from the oscillating circuit OCS having a constant frequency, accordingly the pilot lamp 336 receives the output from the EXCLUSIVE-OR gae 370 and is turned on intermittently. In this fashion the jamming state is indicated.

When the trailing edge of the original document does not pass through the first detecting means S1 after the lapse of the time period T2 when the leading edge of the original document reaches the second detecting means S2, at the time when the time period T2 is lapsed, the copy paper is cut and stops being fed and the pilot lamp 336 turns on intermittently and indicates jamming. In this embodiment the length of the cut copy paper is equal to a multiple of the transferred speed of the copy paper and the time period T2 and is chosen to prevent jamming in the copy paper transferring path 6. The time period T2 is about 7.5 seconds, for example.

(b) Let us assume that jamming occurs after the trailing edge of the original document passes through the first detecting means S1 and when the second detecting means S2 is also detecting the original document. At the time when the trailing edge of the original document passes through the first detecting means S1, the copy paper is cut in the same manner as in the operation step (7) and the copy paper stops being fed. When the time period T2 lapses after the original document reaches the second detecting means S2, the pilot lamp 336 turns on intermittently and indicates jamming, as described above.

In the operation steps (6) to (8) as mentioned before concerning FIG. 13, let us assume that the copy paper is jammed in the copy paper transferring path 6.

In this case the output from the fourth detecting means S4 remains high level, therefore the output from the OR gate 342 is high level. The output from the fifth detecting means S5 is high level, the output from the AND gate 314 is high level, accordingly the output from the AND gate 322 is high level. The AND gate 354 receives the high level output from the AND gate 322 and the constant frequency signal from the oscillating circuit OSC, and the pulse from the AND gate 354 is supplied to the counter 302. When the copy paper is jammed, this pulse remains supplied to the counter 302. After the lapse of the time period T2, in the same manner as jamming of the original document aforementioned, the output from the counter 302 is a high level, accordingly the output from the AND gate 310 is a high level. The high level output from the AND gate 310 operates the copy paper cutting device 14 via the OR gate 312 to cut the copy paper. The high level signal from the counter 302 is inverted to a low level by the NOT gate 324, accordingly the output from the AND gate 314 is low level. Therefore the outputs from the AND gates 316, 320 and 322 are low level. The magnetic clutch 108 does not achieve forward rotation, the feeding clutch 106 is in the OFF state and the feeding of the copy paper is stopped. Simultaneously the charging device 20 and the exposure lamp 76 are stopped. Further the OR gate 376 receives the low level signal from the AND gate 326 and the constant frequency signal from the oscillating circuit OSC in the same manner as at the occurence of jamming of the original document. The output from the OR gate 376 causes the pilot lamp 336 to turn on intermittently via the EXCLUSIVE-OR gate 370 and to indicate jamming.

Now will be described the operation when the feeding clutch 106 is in the ON state and the roll of copy paper 4 is consumed. Let us assume that the roll of copy paper 4 is consumed after the leading edge of the roll of copy paper 4 has arrived at the fourth detecting means S4 in the operation step (6) a explained hereinbefore concerning FIG. 13. The trailing edge of the copy paper 4 reaches the fifth detecting means S5, the fifth detecting means S5 turns ON and the output from the fifth detecting means S5 is low level. The low level signal is applied to the EXCLUSIVE-OR gate 344. Since the output from the third detecting means S3 is high level, the output from the NOT gate 364 is low level. Therefore the output from the EXCLUSIVE-OR gate 344 is low level. The high level signal from the comparing circuit 196 corresponding to the second detecting means S2 is inverted to low level by the NOT gate 372. Accordingly the output from the OR gate 374 is low level and the output from the AND gate is low level and render the magnetic clutch 108 to operate for forward rotation.

The low level signal from the fifth detecting means S5 is applied to the AND gates 326 and 322. Therefore the outputs from the AND gates 326 and 322 are low level. A constant frequency signal from the oscillating circuit OSC is applied through the OR gate 376 to one of the input terminals of the EXCLUSIVE-OR gate 370. The output from the comparing circuit corresponding to the first detecting means S1 is inverted to high level by the NOT gates 352 and 334, and is coupled to the other input terminal of the EXCLUSIVE-OR gate 370. Therefore the pilot lamp 336 receives a pulse from the EXCLUSIVE-OR gate 370 at a time that corresponds to the duration of the signal from the oscillating circuit OSC and the pilot lamp 336 turns ON intermittently to indicate that the roll of copy paper 4 is consumed. The low level signal from the AND gate 322 is applied to and stops the charging device 20 and the exposure lamp 76. The cut device 14 remains stopped. The flip-flop 308 is at low level at the input terminal for reverse rotation of the magnetic clutch 108. Accordingly the magnetic clutch 108 is in the OFF state and the original document stops. The feeding clutch 106 is in the ON state to cause the copy paper to be fed.

When the copy paper is fed and the trailing edge of the copy paper reaches the third detecting means S3, the output from the third detecting means S3 is low level. This low level signal is inverted to high level by the NOT gate 364 and this high level signal is applied to the EXCLUSIVE-OR gate 344. The EXCLUSIVE-OR gate 344 receives the low level signal from the fifth detecting means S5, therefore the output from the EXCLUSIVE-OR gate 344 is high level and this high level signal is applied to the AND gate 316 through the OR gate 374. Since the output from the AND gate 314 is high level, the output from the AND gate 316 is high level and is applied to the input terminal 108*a* to cause the magnetic clutch 108 to rotate forward. The magnetic clutch 108 rotates forward and the original document begins to be fed again in the transferring direction 112. The charging device 20, the exposure lamp 76 and the copy paper cutting device 14 are stopped and the feeding clutch 106 in the ON state. When the copy paper remains to be transferred further and the trailing edge of the copy paper reaches the fourth detecting means S4, the output from the fourth detecting means S4 is low level. Thereby the output from the one shot 332 is low level during the time period T5 and this low level signal is inverted to high level by the NOT gate 384 and is applied to the AND gate 350. Since the output from the fifth detecting means S5 is low level, the output from the AND gate 350 is low level and the flip-flop 308 is not reset. In this situation, a low level reset output signal is applied to the terminal 108*b* for reverse rotation of the magnetic clutch 108, the magnetic clutch 108 does not achieve reverse rotation. Therefore the original document remains to be transferred in the copying exposure direction 112 and fed out onto the original document tray 70. When the trailing edge of the original document reaches the second detecting means S2, the output from the comparing circuit 196 is low level, accordingly the output from the OR gate 342 is low level. Therefore the feeding clutch 106 is in the OFF state. The copy paper remains to be transferred along the copy paper transfer path 6 and is fed out onto the copy paper tray 48.

Let us assume that the copy paper is consumed between the operation steps (4) and (5) as explained concerning FIG. 13, in other words the copy paper is consumed before the leading edge of the copy paper reaches the third detecting means S3. In this case the output from the fifth detecting means S5 is low level, and simultaneously the charging device 20 and the exposure lamp 76 are stopped and the pilot lamp 336 turns ON intermittently and indicates that the roll of copy paper 4 is consumed. When the trailing edge of the copy paper passes through the third detecting means S3, the output from the NOT gate 364 is high level. On the other hand, the output from the fifth detecting means S5 is low level. Therefore the output from the EXCLUSIVE-OR gate 344 is low level. The high level signal from the comparing circuit 196 corresponding to the second detecting means S2 is inverted to a low level by the NOT gate 372. Then the output from the OR gate 374 is low level. In this result the magnetic clutch 108 does not perform forward rotation and the original document remains stopped. When the trailing edge of the copy paper passes through the third detecting means S3, the original document remains to be transferred in the copying exposure direction 112 and is fed out onto the original document tray 70. When the trailing edge of the original document reaches the second detecting means S2, the output from the comparing circuit 196 is low level. Correspondingly the output from the OR gate 342 is low level. This results in that the feeding clutch 106 is in the OFF state and the copy paper remains to be transferred along the copy paper transfer path 6 and is fed out onto the copy paper tray 48.

In this way the roll of copy paper 4 is consumed, the output from the fifth detecting means S5 is low level, accordingly the pilot lamp 336 turns ON intermittently and the charging device 20 and the exposure lamp 76 are stopped, and further the original document stops moving. When the trailing edge of the copy paper passes through the third detecting means S3, transfer of the original document in the copying exposure direction 112 is commenced again. In this case since the distance 19 from the fifth detecting means S5 to cut position P1 is larger than or equal to the distance between each transfer roller, jamming does not occur on the copy paper transfer path 6.

In this fashion when the roll of copy paper 4 is consumed the output from the fifth detecting means S5 is a low level and the pilot lamp 336 turns ON intermittently, the charging device 20 and the exposure lamp 76 are stopped and the original document stops moving. After the trailing edge of the copy paper passes through the third detecting means S3, the transfer of the original document in the copying exposure direction 112 is commenced again. Accordingly the last copy paper is not jammed in the way of the copy paper transfer path 6.

Since the distance l10 is chosen to be larger than or equal to the distance l11, the last copy paper has a length equal only to l9, the last copy paper is transferred positively by the feeding paper rollers 10 and 12 toward the transfer rollers 17 and 19.

Figure 17:
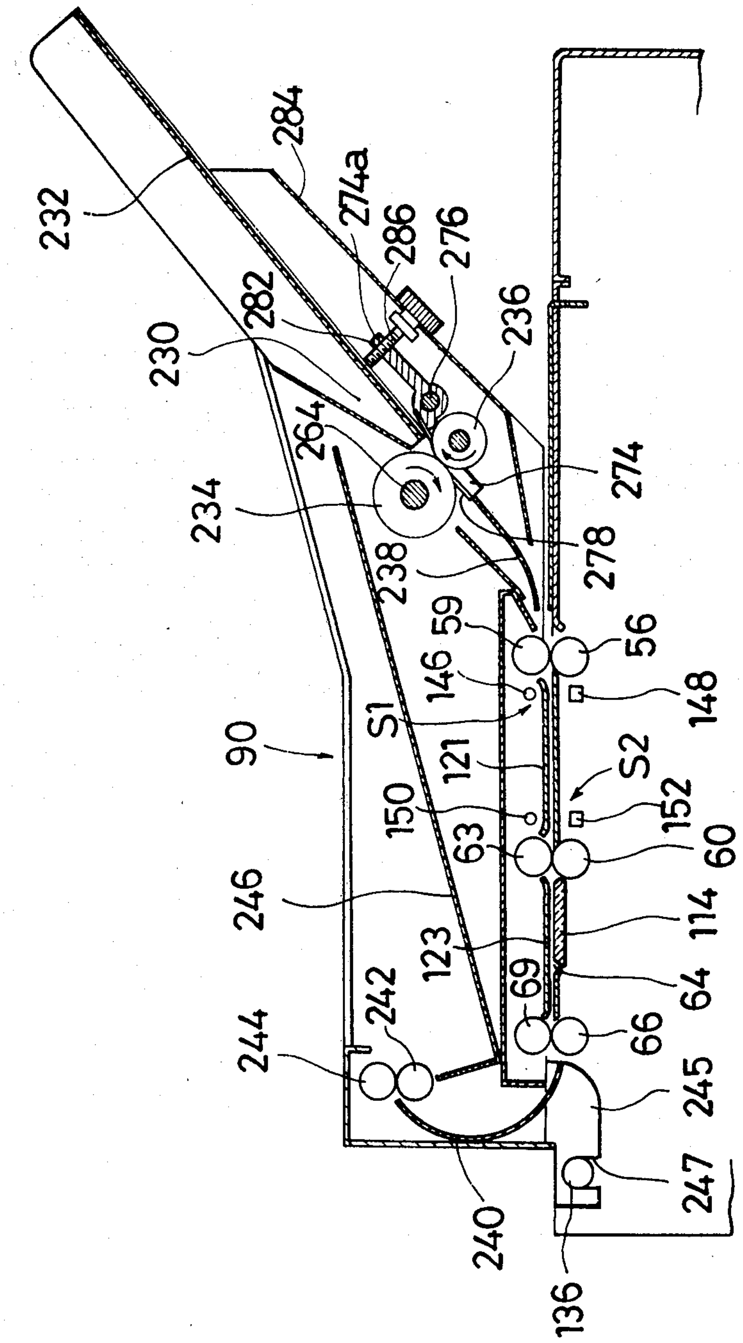
FIG. 17 is a cross sectional view showing the vicinity of the original document automatic feeding assembly shown FIG. 16.

FIG. 16 is a perspective view of the copying apparatus where the original document automatic feeding assembly 90 is mounted on the body 2. FIG. 17 is a cross sectional view showing the vicinity of the original document automatic feeding assembly 90 shown in FIG. 16. The original document automatic feeding assembly 90 is mounted on the frame 2 as an alternative to the aforementioned the original document manual feeding assembly 86. The original document automatic feeding assembly 90 is removable from the frame 2.

By mounting the automatic feeding assembly 90, a plurality of stacked original documents are supplied into the original document inlet 230 and are placed on an inclined original documents plate 232. The original documents move down in a slanting downward direction forwardly along the original document plate 232 by their own weight and the top of the original document is fed out individually by means of transport roller 234 and separate roller 236. The original document is guided by guide plate 238 and is transported to the transport rollers 56 and 59, and passes through transport rollers 60 and 63 and the scanning slit 64 and is scanned in the fashion similar to manual feeding of the original document individually by using the aforementioned original document manual feeding assembly 86. After completion of the scanning, the original document is reversed and forwarded from the transport rollers 66 and 69 and passes through an athwartly curved guide plate 240 to a pair of feed rollers 242 and 244 and is fed out onto an original document receiving tray 246 from the feed out rollers 242 and 244.

Thus, in the case where the original document automatic feeding assembly 90 is employed, the original document is not fed out onto the original document receiving tray 70 attached to the frame 2, but rather is fed out onto the original document receiving tray 246 of the original document automatic feeding assembly 90.

The original document automatic feeding assembly 90 encloses follower transport rollers 59, 63 and 69 which are rotatably mounted and correspond individually to the driving transport rollers 56, 60 and 66 mounted rotatably on the top of the frame 2. When the original document automatic feeding assembly 90 is mounted on the top of the frame 2, each of the follower transport rollers 59, 63 and 69 is spring-biased toward each of corresponding driving transport rollers 56, 60 and 66 by a spring (not shown). The depressing plates 121 and 123 are situated individually between the transport rollers 59 and 63 and between the transport rollers 63 and 69. Engaging members 245 protrudes at the end of the original document automatic feeding assembly 90 on the forward side of the feeding direction (left side of FIG. 17). The original document automatic feeding assembly 90 is removably mounted on the frame 2 by engaging the pins 134 and 136 of the frame 2 with notches 247 of the engaging members 245. The notch 247 is openning downwardly.

Figure 18:
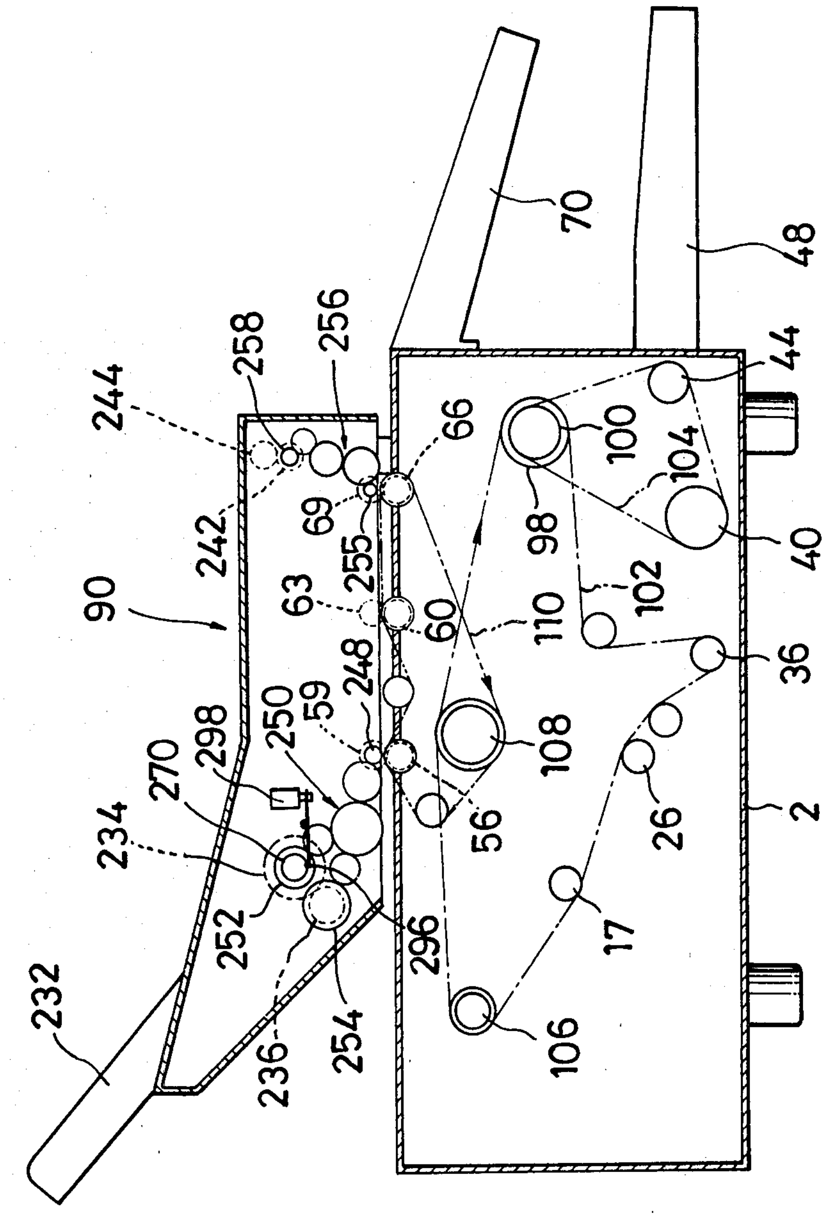
FIG. 18 is a simplified elevational cross sectional view showing from the rear side of the copying apparatus of FIG. 16.

FIG. 18 is a simplified elevational cross sectional view shown from the rear side of the copying apparatus of FIG. 16. A gear 248 coaxial with the transport roller 59 of the original document automatic feeding assembly 90 engages through a gear train 250 individually with a gear 252 coaxial with the transport roller 234 and a gear 254 coaxial with the separating roller 236. The transport roller 234 and the separating roller 236 are driven in the same rotating direction. A gear 255 coaxial with the transport roller 69 engages through a gear train 256 with a gear 258 coaxial with the feed out roller 242.

Figure 19:
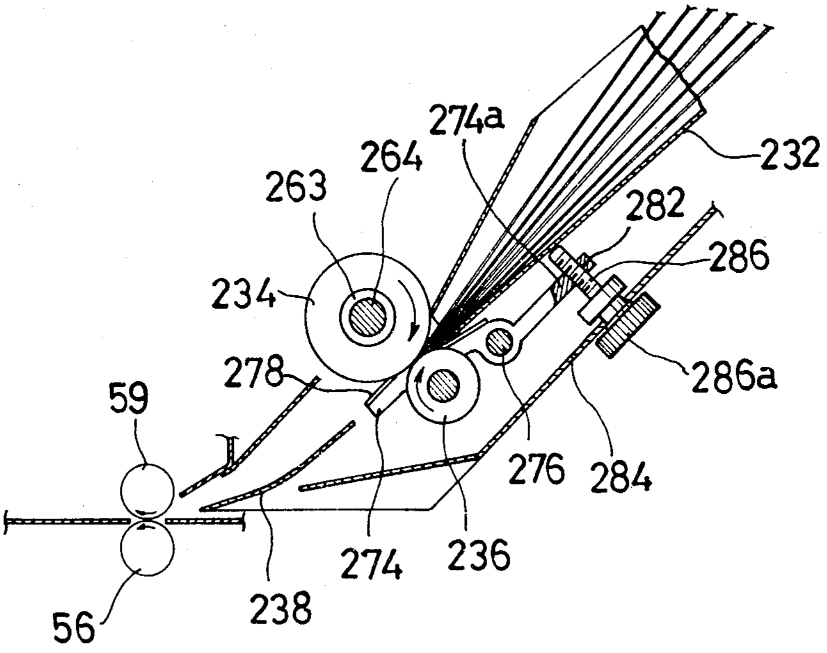
FIG. 19 is a cross sectional view in the vicinity of a transport roller and a separate roller.
Figure 20:
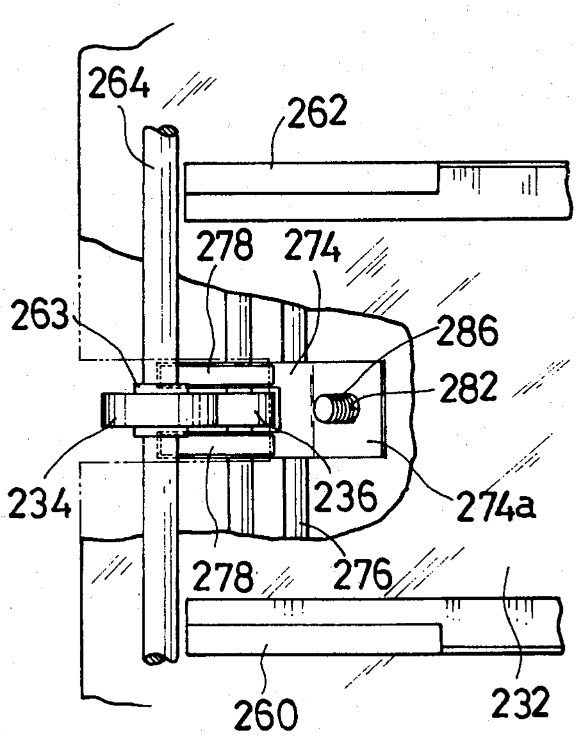
FIG. 20 is a plan view illustrating a portion of FIG. 19.
Figure 21:
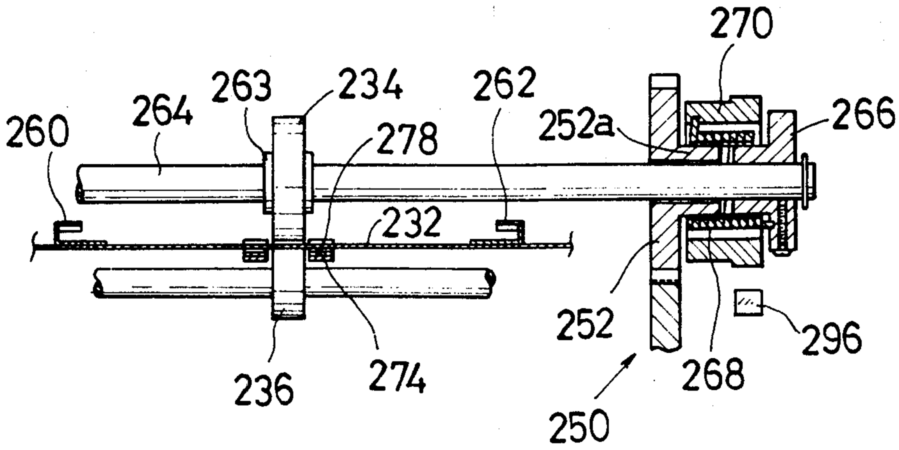
FIG. 21 is an elevational view partly broken in cross section as viewed from insertion side of FIG. 20.

FIG. 19 is a cross sectional view showing the vicinity of the transport roller 234 and the separating roller 236. FIG. 20 is a plan view of FIG. 19. FIG. 21 is a partially cut away cross sectional view shown from the insertion side of FIG. 20 (right side of FIG. 17). As shown FIG. 19, a plurality of the original documents are stacked on the original document plate 232 and the leading edges of the original documents are off set from each other in the forward transport direction along with the upward sheet. The sides of each original document are in alignment with side stopper plates 260 and 262 in the width direction (as shown in FIG. 20) of the original document plate 232.

At the downstream position of the original document plate 232, transport roller 234 and separating roller 236 are supported at the upper and lower sides, respectively of plate 232. The transport roller 234 is associated with a rotary shaft 264 by means of one way clutch 263. Gear 252 engaged with the gear 248 of the transport roller 59 is inserted loosely on the end of the rotary shaft 264. A boss 252*a* of the gear 252 extends along the rotary shaft 264. A boss member 266 is faces the boss 252*a* and is fixed to the rotary shaft 264. There is provided a spring 268 which surrounds the boss 252*a* and the boss member 266. A ratchet wheel 270 surrounds the periphery of the spring 268. The spring 268 has a winding direction to join the boss 252*a* and the boss member 266 in the forward direction of rotation of the rotary shaft 264. One end of the spring 268 is connected to the boss member 266 and the other end is connected to the ratchet wheel 270. The ratchet wheel 270 and the spring 268 make a so-called rap spring clutch. There is provided a magnetic solenoid 298 (see FIG. 18) having a claw 296 engaging the ratchet wheel 270. When the magnetic solenoid 298 is excited, the claw 296 disengages from the ratchet. In this state the rotating torque of the gear 252 is transmitted to rotary shaft 264. When the magnetic solenoid 298 is in the unactuated state, the claw 296 engages with the ratchet wheel 270 and the gear 252 is free to rotate on the rotary shaft 264 and the rotary torque of the gear 252 is not transmitted to the rotary shaft 264.

Figure 22:
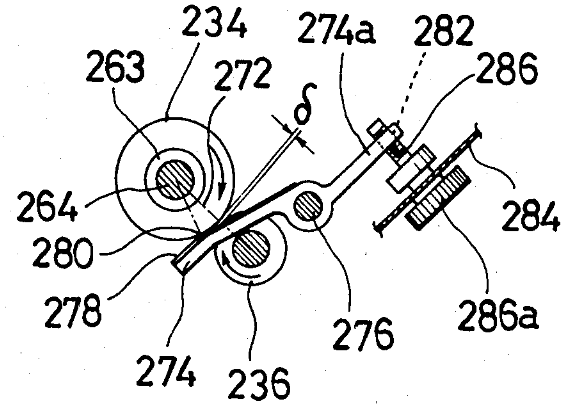
FIG. 22 is a cross sectional view of the vicinity of the transport roller and the separate roller.

Referring now to FIG. 22, the transport roller 234 and the separating roller 236 are spaced by a distance $\delta$ at the position of a line 272 extending from the center of the roller 234 to the center of separating roller 236. This line 272 is referred to as a separating operation line hereinafter. This distance $\delta$ is chosen to be sufficient to enable transport of the original documents individually.

The rotating directions of the transport roller 234 and the separating roller 236 are the same. Accordingly the transport direction of the transport roller 234 and the separating roller 236 are opposite to each other at the position of the separating operation line 272, the transport roller 234 is rotated to transport the original document in a forward transport direction, and the separating roller 236 is rotated to transport the original document in a reverse transport direction. When the original documents pass downwardly by their own weight along the original document plate 232, the leading edge of the original documents are being in an offset manner with the upper sheets extending progressively forward in the forward transport direction. The uppermost original document is transported in the forward transport direction by the transport roller 234. The remaining of the original documents below the uppermost of the original documents are returned in the reverse transport direction by the separating roller 236. In this fashion, the original documents are transported successively one by one top sheet after top sheet.

A transport guide plate 274 has portions provided on opposite axial sides of the transport roller 234 and the separating roller 236 to transport the original documents one by one positively. The transport guide plate 274 is situated swingably by means of a shaft 276 parallel to the rotary shaft 264 below the original document plate 232. This transport guide plate 274 extends from the shaft 276 to downstream of the separating operation line 272 along the transport direction and at a right angle to the separating operation line 272. A frictional plate 278 is mounted on the transport guide plate 274. The frictional plate 278 is made of a material having a high frictional force and a high resistance to wear, for example polyurethane. A curved portion 280 of the transport guide plate 274 is positioned on the side of the transport roller 234 with respect to a tangential line of the separate roller 236 which extends at a right angle to the line 272. There is provided an internal thread 282 at a right angle to the shaft 276 on an end 274*a* opposite to the rollers 234 and 236 with respect to the shaft 276 of the transport guide plate 274.

A head 286*a* of a screw 286 is supported on a front plate 284 of the original document automatic feeding assembly 90 and extends rotatably through the front plate 284. threaded into the internal thread 282. The transport guide plate 274 is moved when the head 286*a* of the screw 286 is turned. The head 286*a* is positioned on the outer side of the front plate 284. Accordingly the transport guide 274 is turned around the shaft 276. Therefore it is possible to adjust the position of the transport guide plate 274 along the separating operation line 272.

In the event that two stacked original documents are fed over the separating operation line 272, the transport guide plate 274 allows passage of the upper sheet only of the two original documents. In other words the lower sheet of the original documents is in contact with the frictional plate 278 of the transport guide plate 274 which applies a large frictional force so as to stop movement in the forward transport direction. This positively ensures that only the upper sheet of the original documents is fed.

Referring to FIGS. 6 and 14 aforementioned, the operation for copying a plurality of the original documents automatically and one by one is set forth hereinafter by employing the original document automatic feeding assembly 90.

Initially the power switch 92 is turned on and the automatic feeding switch 290 (shown in FIG. 16) of the original document automatic feeding assembly 90 is turned on. The operation in this case is the same as in the operation step (1) as stated. The charging device 20, the exposure lamp 76 and the copy paper cutting device 14 are stopped, the feeding clutch 106 is held OFF and the magnetic clutch 108 is in the OFF state. Accordingly the chain 110 is not driven, and the transport roller 234 and the separating roller 236 are not rotated. The low level output from the comparing circuit 218 corresponding to the first detecting means S1 is inverted to high level by the NOT gate 352, the third detecting means S3 is held OFF to cause a NOT gate 364 to provide the high level output. Therefore the output from the AND gate 362 is high level. Since the output from the fifth detecting means S5 is high level, the output from the AND gate 360 is high level to excite the magnetic solenoid 298. This results in the claw 296 disengaging from the ratchet wheel 270. Similar to the operation step (2) aforementioned, the magnetic clutch 108 accomplishes forward rotating operation after the lapse the time period T1 of the clear circuit CLR. The transport rollers 56, 59 rotating forwardly cause the gear 252 of the transport roller 234 and the gear 254 of the separating roller 236 to rotate via the gear 248 and the gear train 250. Since the magnetic solenoid 298 is maintained energized, and the claw 296 is disengaged from the ratchet wheel 270, the gear 252 rotates the rotary shaft 264 and thus the transport roller 234. Simultaneously the separating roller 236 and feeding outrollers 242 and 244 are rotated. Otherwise, the operation is the same as the operation step (2).

The rotating operation of the transport roller 234 and the separating roller 236 cause only the top sheet of the stacked original documents to be fed. At the time when the leading edge of the original document is detected by the first detecting means S1, the output from the comparing circuit 218 which corresponds to the first detecting means S1 is high level. Therefore the outputs from the AND gates 362 and 360 are low level and cause the magnetic solenoid 298 to deenergize. As a result, the claw 296 engages with the ratchet wheel 270 to stop the rotating operation of the rotary shaft 264. The leading edge of the original document is nipped between the transport rollers 56 and 59, the original document is maintained to be transported by means of the transport rollers 56 and 59 to rotate the transport roller 234 mounted on the rotary shaft 264 via the one-way clutch 263. Further operation is the same as the operation step (3) as aforementioned. The operation is accomplished similar to operation steps (13) to (15) successively. During this time, the second and further original documents are stationary on the original document plate 232.

At the time when the trailing edge of the first original document tranvels through the first detecting means S1, the copy paper is severed by the copy paper cutting device 14 to have a length equal to that of the original document in a manner similar to operation step (16). In this state the output from the third detecting means S3 is high level. Therefore the low level output from the NOT gate 364 is applied to the AND gate 360, the output of which is low level to deenergize the magnetic solenoid.

When the trailing edge of the severed copy paper travels through the third detecting means S3, the output from the third detecting means S3 is low level to cause the NOT gate 364 to provide a high level output. Since the low level output from the comparing circuit 218 corresponding to the first detecting means S1 is inverted to high level by the NOT gate 352, the output from the AND gate 362 is high level, therefore the output from the AND gate 360 is high level to energize the magnetic solenoid 298. This commences the transportation of the second original document by the rotating operation of the transport roller 234. Further operation is the same as the aforementioned operating step (17).

When the first copy paper passes through the fourth detecting means S4, operation the same as the aforementioned operation step (18) is accomplished. When the second original document reaches the first detecting means S1, operation the same as the operation step (2) is accomplished, the second and further original documents are copied successively in a fashion similar to that discussed concerning the first original document. The original documents which have being copied are stacked successively on the original document receiving tray 246, and the lowest sheet is the first original document. After the completion of the copying operation of all the original documents, the magnetic solenoid 298 is maintained to be energized to rotate the transport roller 234.

In the case where the original document automatic feeding assembly 90 is mounted on the frame 2, the original document is capable of being fed manually along the original document insertion course 52 from the original document insertion opening 54. In this case, the original document which has been copied is fed out onto the original document receiving tray 246 of the original document automatic feeding assembly 90.

In accordance with one aspect of the invention, there may be provided a counter capable of storing a preset number of copying operations to be performed, alternatively to the counter 168, so that the preset number of copies of each original document are made. According to another aspect of the invention a timer alternative to the fourth detecting means S4 is employed, the timing period of the timer is equal to the duration from the passing of the trailing edge of the copy paper through the third detecting means S3 to the arrival at the fourth detecting means S4, so that the original document is transported in a direction reverse to the copying exposure direction responsive to an output from the timer.

Figure 23:
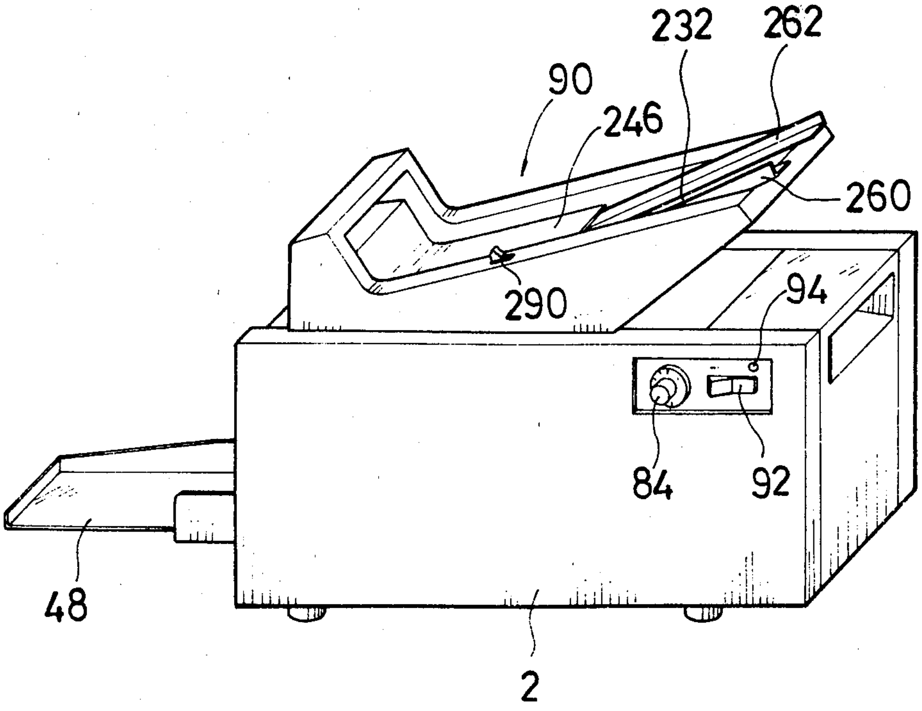
FIG. 23 is a perspective view illustrating another embodiment of the invention.

FIG. 23 is a perspective view of another embodiment of this invention. In this embodiment, the original document automatic feeding assembly 90 is fixedly mounted on the frame 2. Since the original document is fed out on the original document receiving tray 246 of the original document automatic feeding assembly 90, the original document receiving tray 70 is not necessary.

This invention is not intended to be applied only to the aforementioned copying apparatus wherein the original document is moved to copy, but also to a copying apparatus wherein the optical device is moved to copy.

In addition to the apparatus outlined above, many other modifications and/or additions to the invention will be readily apparent to those skilled in the art upon reading this disclosure, and these are intended to be encompassed within the scope of the invention disclosed and claimed herein.

What is claimed is:

1. In a copying apparatus employing a roll of copy paper, the improvement comprising:

a copy paper cutting device provided along a copy paper passageway for cutting said roll of copy paper during a copying operation;

detecting means provided upstream of said copy paper cutting device, with respect to a transport direction along said copy paper passageway, for detecting a final trailing edge of said roll of copy paper;

driving means for driving an original document or an optical device of the apparatus;

detecting means for detecting a moving position of said original document or said optical device;

means for operating said copy paper cutting device when said moving position detecting means detects a predetermined position of said original document or said optical device;

means for stopping said driving means when said final trailing edge of said roll of copy paper is detected by said final trailing edge detecting means; and copy paper transport means for transporting said copy paper from a frame of the copying apparatus when the leading edge of said copy paper passes through said copy paper cutting device, and when said final trailing edge of said copy paper is detected by said final trailing edge detecting means.

2. The improvement claimed in claim 1, wherein the distance from said final trailing edge detecting means to said copy paper cutting device along said copy paper passageway is greater than or equal to the distance between transport rollers spaced from each other along said copy paper passageway.

3. The improvement claimed in claim 1, further comprising a feeding roller between said final trailing edge detecting means and said copy paper cutting device, and the distance between said feeding roller and said final trailing edge detecting means is greater than or equal to the distance from said copy paper cutting device to a transport roller nearest said copy paper cutting device and downstream thereof along said transport direction.

4. The improvement claimed in claim 1, wherein said moving position detecting means comprises first detecting means provided upstream of a scanning window of the apparatus, with respect to a copying exposure direction along an original document passageway, for detecting the trailing edge of said original document, and second detecting means provided upstream of said scanning window and downstream of said first detecting means for detecting the leading edge of said original document, and further comprising third detecting means, spaced upstream of an exposure station of the apparatus, with respect to a transport direction along said copy paper passageway, by a distance equal to the distance between said second detecting means and said scanning window, and spaced downstream of a cut position of said copy paper cutting device by a distance equal to the distance between said first detecting means and said second detecting means, for detecting the leading edge of said copy paper, return control means for generating a signal when a predetermined period of time lapses after said leading edge of said copy paper passes said third detecting means to transport said original document upstream of the copying exposure direction from said second detecting means in a direction reverse to said copying exposure direction, a counter for stopping said return control means until a preset number of copying operations is achieved, and such that said copy paper is fed when said leading edge of said original document transported in said copying exposure direction along said original document passageway reaches said second detecting means, then said original document is fed simultaneously when said leading edge of said copy paper reaches said third detecting means, and an exposure operation, a developing operation and a fixing operation are accomplished in that order, said roll of copy paper being cut and said roll of copy paper being stopped from feeding when said trailing edge of said original document reaches said first detecting means.

5. The improvement claimed in claim 4, wherein said return control means comprises fourth detecting means, provided downstream in said transport direction of said exposure station along said copy paper passageway, for detecting the trailing edge of said copy paper.

6. The improvement claimed in claim 4, wherein said return control means comprises a timer for generating a signal after a time period during which the trailing edge of said copy paper passes through said third detecting means, said copying exposure operation is accomplished, and said original document is returned in said direction reverse to said copying exposure direction.

7. The improvement claimed in claim 4, wherein said roll of copy paper is cut and an exposure lamp of said exposure station is turned off when one of said first detecting means, said second detecting means and said third detecting means detect said original document or said copy paper during a time prior corresponding to the length of said copy paper which is a maximum length permitting transportation of said copy paper.

8. The improvement claimed in claim 4, wherein, in the case of a plurality of copies, said roll of copy paper is cut only when said first detecting means detects said trailing edge of said original document and said return control means is operated.

9. The improvement claimed in claim 1, further comprising an original document automatic feeding assembly including an inclined original document supporting plate for supporting and positioning thereon a stack of a plurality of original documents, a transport roller rotating to transport a top sheet of said stack of original documents moving downwardly by its own weight on said original document supporting plate toward an original document passageway, a separating roller spaced below and away from said transport roller and rotating so as to transport sheets below said top sheet in a direction reverse to said transport direction, a transport guide plate having portions on opposite sides of said transport roller and separating roller and in contact frictionally with the lowest sheet of said stack of original documents, and a surface of said transport guide plate adjacent an axis of said transport roller being positioned forward in said transport direction of a line connecting the center of said separating roller and the center of said transport roller, on the side of said transport roller with respect to a trangential line of said separating roller extending at a right angle to said central line.

10. The improvement claimed in claim 9, wherein said transport guide plate is adjustable vertically along said central line.

11. The improvement claimed in claim 1, wherein a plurality of driving transport rollers are mounted along said transport direction on said frame of the copying apparatus, each of a manual original document feeding assembly for feeding said original documents individually and an automatic original document feeding assembly for feeding a plurality of said original documents automatically has follower transport rollers in contact with and driven by said driving transport rollers, said original document passageway is formed between said driving transport rollers and said follower transport rollers, said manual original document feeding assembly has on a leading portion thereof in said transport direction an engaging member having a notch which engages a pin protruding from a top portion of a side wall of said frame, said automatic original document feeding assembly has on a leading portion thereof in said transport direction an engaging member having a notch of the same dimension as said notch of said manual original document feeding assembly, whereby said manual original document feeding assembly and said automatic original document feeding assembly are alternatively positionable on and removable from the top portion of said frame.

* * * * *